(12) United States Patent
Duerstock et al.

(10) Patent No.: US 10,842,693 B2
(45) Date of Patent: Nov. 24, 2020

(54) MOTORIZED MOUNT FOR SEATING SYSTEM

(71) Applicant: Purdue Research Foundation, West Lafayette, IN (US)

(72) Inventors: Bradley S. Duerstock, West Lafayette, IN (US); Jeffrey Ackerman, Arvada, CO (US)

( * ) Notice: Subject to any disclaimer, the term of this patent is extended or adjusted under 35 U.S.C. 154(b) by 0 days.

(21) Appl. No.: 16/007,638

(22) Filed: Jun. 13, 2018

(65) Prior Publication Data

US 2019/0133855 A1    May 9, 2019

Related U.S. Application Data

(60) Provisional application No. 62/518,662, filed on Jun. 13, 2017.

(51) Int. Cl.
| | | |
|---|---|---|
| *A61G 5/10* | (2006.01) |
| *A61G 5/08* | (2006.01) |
| *A61G 5/00* | (2006.01) |
| *F16M 13/02* | (2006.01) |
| *F16M 11/18* | (2006.01) |
| *F16M 11/38* | (2006.01) |
| *A47C 7/62* | (2006.01) |
| *A61G 5/04* | (2013.01) |
| *B60N 3/00* | (2006.01) |

(52) U.S. Cl.
CPC .............. *A61G 5/1094* (2016.11); *A47C 7/62* (2013.01); *A61G 5/04* (2013.01); *A61G 5/08* (2013.01); *A61G 2203/16* (2013.01); *A61G 2203/20* (2013.01); *B60N 3/002* (2013.01); *F16M 11/18* (2013.01); *F16M 11/38* (2013.01); *F16M 13/022* (2013.01)

(58) Field of Classification Search
CPC .... A47C 7/62; A61G 5/1094; A61G 2203/16; A61G 2203/20; A61G 5/04; A61G 5/08; A61G 5/00; F16M 13/022; F16M 11/18; F16M 11/38; F16M 11/202; B60N 3/002; A61D 11/0638
See application file for complete search history.

(56) References Cited

U.S. PATENT DOCUMENTS 3,637,092 A  *  1/1972  George ...................... B25J 3/04
                                                                    414/5
6,375,257 B1 *  4/2002  Wooding ................. A47C 7/70
                                                                    248/218.4

(Continued)

*Primary Examiner* — Tan Le
(74) *Attorney, Agent, or Firm* — Gutwein Law; Tyler Droste

(57) ABSTRACT

The present disclosure illustrates a motorized mount with a plurality of degrees of freedom coupled to a seating system. The motorized mount assembly can include an attachment assembly configured to attach to a seating assembly. A vertical control assembly can be connected to the attachment assembly with an arm having a first end attached to vertical control assembly by a first hinge. A mounting assembly can be attached to a second end of the arm. The mounting assembly can configured to receive a personal computing device. A linear actuator may be attached to the vertical control assembly to raise and lower the arm and mounting assembly. A first motor can be configured to attach to the arm. A second motor can be configured to attach between the arm and the mounting assembly.

19 Claims, 39 Drawing Sheets

(56) References Cited

U.S. PATENT DOCUMENTS

| | | | |
|---|---|---|---|
| 6,522,748 B1 | 2/2003 | Wang | |
| 6,655,645 B1 | 12/2003 | Lu et al. | |
| 8,054,388 B2 * | 11/2011 | Hurd | F16M 11/10 |
| | | | 248/183.1 |
| 8,448,581 B2 * | 5/2013 | Hanna | B64D 11/06 |
| | | | 108/137 |
| 2007/0095582 A1 * | 5/2007 | Stuijt | A61G 5/10 |
| | | | 180/65.1 |
| 2008/0197257 A1 | 8/2008 | Stoelinga | |
| 2008/0250983 A1 | 10/2008 | Sundarrao | |
| 2011/0031785 A1 | 2/2011 | Daniel | |
| 2011/0067606 A1 | 3/2011 | Sundarrao | |
| 2013/0099539 A1 | 4/2013 | Fienup et al. | |
| 2014/0268560 A1 * | 9/2014 | Duerstock | F16M 13/022 |
| | | | 361/679.58 |
| 2015/0136938 A1 * | 5/2015 | Kondo | B60N 2/502 |
| | | | 248/573 |

* cited by examiner

*FIG. 1* A, B, C, D, E & F

MOTORIZED MOUNT FOR SEATING SYSTEM

CROSS-REFERENCE TO RELATED APPLICATION

This U.S. patent application claims priority to U.S. Provisional Application 62/518,662 filed Jun. 13, 2017, the disclosure of which is considered part of the disclosure of this application and is hereby incorporated by reference in its entirety.

GOVERNMENT RIGHTS

This invention was made with government support under GM096842 awarded by the National Institutes of Health and 1520098 awarded by the National Science Foundation. The government has certain rights in the invention.

FIELD OF THE INVENTION

The invention described herein pertains to a motorized mount for a seating system, and specifically to a mount system with a plurality of degrees of freedom controlled electronically.

BACKGROUND

Computing devices may be used for a variety of communication, educational, occupational, and entertainment purposes and, as such, have become an important part of daily life. Furthermore, mobile computing devices may enable persons with disabilities, including wheelchair users, to be more independent and productive wherever they go. Persons with disabilities are often limited to using their computing devices only at a specific location (e.g., their home or office), rather than being able to employ these devices wherever they are. For quadriplegics, the ability to readily access their computing devices when and where needed has been problematic. A quadriplegic has little or no movement in their arms to carry or retrieve computing devices from a book bag, pocket, or case.

Wheelchairs typically do not provide a convenient space or location to store a computing device so that it does not impede the motion of the wheelchair or its user. Powered wheelchair users, particularly those with upper extremity disabilities, currently do not have any way to automatically place computing devices on or about their laps for use and then to retract when not needed. Many commercial wheelchair mounts are rigidly affixed to the wheelchair and must be physically repositioned or removed by someone else in order to go underneath tables or to transfer out of the wheelchair. Swinging away a tray or platform of a mount can be difficult for someone with limited hand or arm strength or dexterity. Additionally, even when the tray is in its retracted position, the mount may still cause an impediment to the wheelchair when positioned under tables or through narrow doorways. Therefore, improvements are needed in the field.

SUMMARY OF THE INVENTION

In one aspect, the present disclosure relates to a motorized mount assembly for use with a seating assembly. The motorized mount assembly can include an attachment assembly configured to attach to a left or right side of a seating assembly. A parallel four-bar linkage can be connected to the attachment assembly with an arm having a first end attached to the four-bar linkage by a first hinge, the first hinge configured to allow the arm to rotate in a horizontal plane. A mounting assembly can be attached to a second end of the arm by a second hinge, the second hinge may be configured to allow the mounting assembly to rotate in a vertical plane to adjust the tilt of mounting assembly. The mounting assembly can configured to receive a personal computing device, such as a table, phone or computer. A linear actuator may be attached to the four-bar linkage to raise and lower the arm and mounting assembly along a vertical axis. A first motor can be configured to attach to the arm and configured to move the arm in a horizontal plane. The motor can be configure to move the arm around a rotational axis about 360°. A second motor can be configured to attach between the arm and the mounting assembly and configured to adjust a tilt position of the mounting assembly. An electrical control unit can be operatively connected configured to control to the linear actuator, the first motor and the second motor.

In another aspect, the present disclosure relates to a motorized mount assembly for use with a seating assembly. The motorized mount assembly can include an attachment assembly configured to attach to a left or right side of a seating assembly. A vertical control assembly can be connected to the attachment assembly with an arm having a first end attached to vertical control assembly by a first hinge, the first hinge configured to allow the arm to rotate in a horizontal plane. A mounting assembly can be attached to a second end of the arm by a second hinge, the second hinge may be configured to allow the mounting assembly to rotate in a vertical plane to adjust the tilt of mounting assembly. The mounting assembly can configured to receive a personal computing device, such as a table, phone or computer. A linear actuator may be attached to the vertical control assembly to raise and lower the arm and mounting assembly along a vertical axis. A first motor can be configured to attach to the arm and configured to move the arm in a horizontal plane. The motor can be configure to move the arm around a rotational axis about 360°. A second motor can be configured to attach between the arm and the mounting assembly and configured to adjust a tilt position of the mounting assembly. An electrical control unit can be operatively connected configured to control to the linear actuator, the first motor and the second motor.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION

Figure 1A:
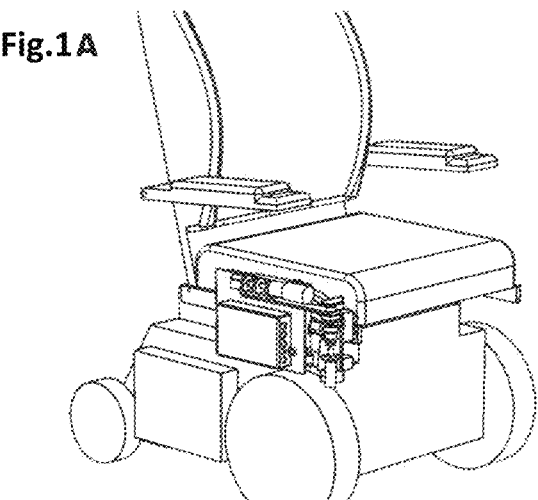
FIG. 1A illustrates an exemplary embodiment of the motorized mount of the present disclosure in fully retracted position.
Figure 1D:
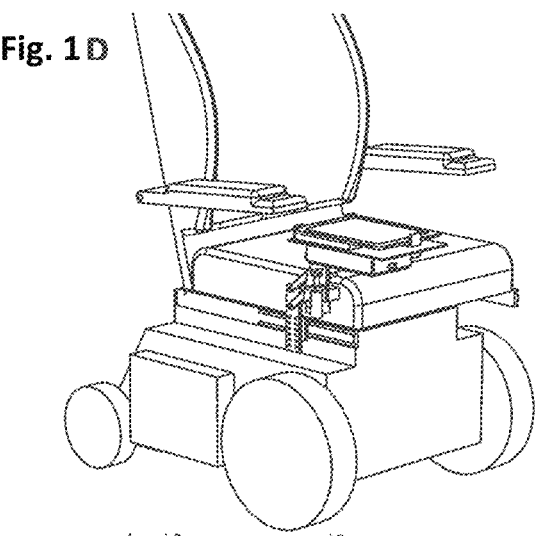
FIG. 1D illustrates an exemplary embodiment of the motorized mount of the present disclosure in a third intermediate position.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

The present disclosure relates generally to a motorized mount for a wheelchair, which may be used to automatically deploy and retract a computing device (e.g., a tablet, a laptop, or other mobile computing device) coupled to an articulating arm. The motorized mount is configured to attach to a manual or powered wheelchair and to achieve one or more of the following goals: (1) not excessively exceeding the width of the wheelchair to allow passage through standard doorways, (2) being easily attachable to and removable from the wheelchair with simple (or no) tools, (3) not impeding a wheelchair user from transferring into or out of the wheelchair, (4) being operable with a single switch, and (5) not interfering with the standard seat movements or functions of advanced powered wheelchairs with tilting, reclining, standing, and elevating seat functions.

According to one aspect, a motorized mount 10 is configured to operate according to a plurality of degrees of freedom. Specifically illustrated in FIG. 1A-1F, and more specifically in FIG. 2-25 are three separate degrees of freedom, allowing the motorized mount to deploy and adjust for the user, and retract to a position which does not hinder any other function of the seating system.

The motorized mount 10 can be coupled to a seating system. FIG. 1A illustrates a motorized mount 10 coupled to a wheelchair 12. The motorized mount 10 is illustrated as coupled to a right side of the wheelchair 12, although the motorized mount 10 may be alternatively mounted on a left side of the wheelchair 12 in other embodiments. The motorized mount 10 includes an attachment assembly 14 (see FIG. 12) which attaches to the side of the wheelchair as shown, a parallel four-bar linkage assembly 16, which may include on or more arms, such as a first arm 6 and a second arm 7, connecting the attachment assembly 14 to an arm 17 via a first hinge 60 (see FIG. 11, a linear actuator 18 which drives the linkage assembly to raise and lower the arm 17, a first motor assembly 20 which connects to a first end of the arm to rotate the arm in a horizontal plane, a mounting assembly 22 (see FIG. 11) connected to a second end of the arm via a second hinge 62, the mounting assembly configured to receive a computing device such as an electronic tablet, a second motor assembly 21 to rotate the mounting assembly in a vertical fashion (i.e., tilt), and an electrical control assembly 24 operatively connected to the linear actuator 18 and the motors 20 and 21. In another exemplary embodiment, the mounting assembly 22 can be couple directly to the driveshaft 64 of the second motor 21 and the second motor can rotate the mounting assembly 22 around an axis formed by the drive shaft 64. The mounting assembly can be used to house a personal computing device 8, such as a tablet, smartphone, FIGS. 2-5 shows the motorized mount in a stored position, with the top edge of the mount 10 positioned below the seating surface. As shown in FIGS. 6-9, the linear actuator is first activated by the control assembly 24 to drive the four-bar linkage assembly 16, thereby raising the arm 17 and the mounting assembly 22. The linear actuator can control the vertical movement of the arm 17 along the y-axis and control the height of the arm 17. As shown in FIG. 10-13, in the next step, the first motor 20 and second motor 21 are driven to rotate the arm 17 (horizontally) and the mounting assembly 22 (vertically). The first motor can be used to rotate the arm and outing assembly around a first axis (A), wherein the first motor allows for a rotation around the vertical axis in about 360°. The second motor 21 can be used to rotate the mounting assembly around a horizontal axis (B) to adjust the orientation of the mounting assembly 22 based on a user's preference or based upon a pre-set determination. As shown in FIG. 14-17, the linear actuator 18 continues to drive the linkage assembly until a final height is reached, preferably above the user's thigh when seated in the seating system. The first motor completes rotation to 180 degrees and the second motor completes rotation to 90 degrees as shown. As shown in FIG. 18-21, the first motor then rotates the arm 17 an additional 90 degrees to position the mounting assembly in front of the user and above their thigh. Lastly, the second motor may be further rotated up to an additional 90 degrees vertically based on user input from a control switch operatively coupled to the control unit 24 to achieve a desired tilt or device viewing angle as shown in FIG. 22-25. The control unit 24 can be coupled to a power source 300, including but not limited to, a battery.

An input switch may be mounted on an armrest of the seating system. Depending on the input switch it may be mounted in different locations on the seating system to be accessible to a user. The input switch is coupled to the linear actuator 18 and motor assemblies 20 and 21 by the electrical control unit. The linear actuator 18 can have an extension arm 19 having a first end and a second. The first end can be proximate to the end of the actuator. The second end can be coupled to first arm 6 of the linkage assembly 16. When the actuator is activated, the arm 19 can extend outwards causing the arm 17 and mounting assembly 22 to move vertically along an axis.

The motorized mount 10 may be coupled to the wheelchair 12 by the attachment assembly 14 using any number of mechanisms. In the illustrative embodiment, a mounting bracket 26 (see FIG. 12) of the attachment assembly 14 is coupled to a seating system of the wheelchair 12. One example includes a number of bolts placed through a number of holes formed in the mounting bracket 26 to secure it to the wheelchair 12. Many powered wheelchairs have side rails (such as fail 27) for mounting accessories. In certain embodiments, the attachment assembly 14 and/or the mounting bracket 26 may be mounted to such mounting rails 27. Certain embodiments may also include a spring-loaded quick-release mounting bracket which is attached to the side of the wheelchair and into which the attachment assembly 14 can be mounted. The mounting assembly 22 (as well as any other components of the motorized mount 10) may comprise any durable substance, such as aluminum, titanium, iron, steel, resin, or the like. It will be appreciated that the attachment of the motorized mount 10 will vary according to the style of wheelchair 12 and/or the seating system used. Those skilled in the art will recognize that adjustments may be made to the motorized mount 10, including the mounting bracket 26, to fit different brands and models of wheelchairs 12 (as well as other seating systems).

Where an alternative input device (e.g. a sip and puff, a touch switch, a magnetic switch, electromyography, etc.) is used in place of the input switch, the motorized mount 10 may include an electronic controller for interpreting signals from the alternative input device. This controller might process other signal related to the wheelchair 12 as well (e.g., a video feed from a camera mounted on the chair). It is contemplated that the motorized mount 10 may be powered by either the batteries of the wheelchair 12 or an external power source, including, but not limited to, separate batteries, solar power, or kinetic power.

Figure 26:
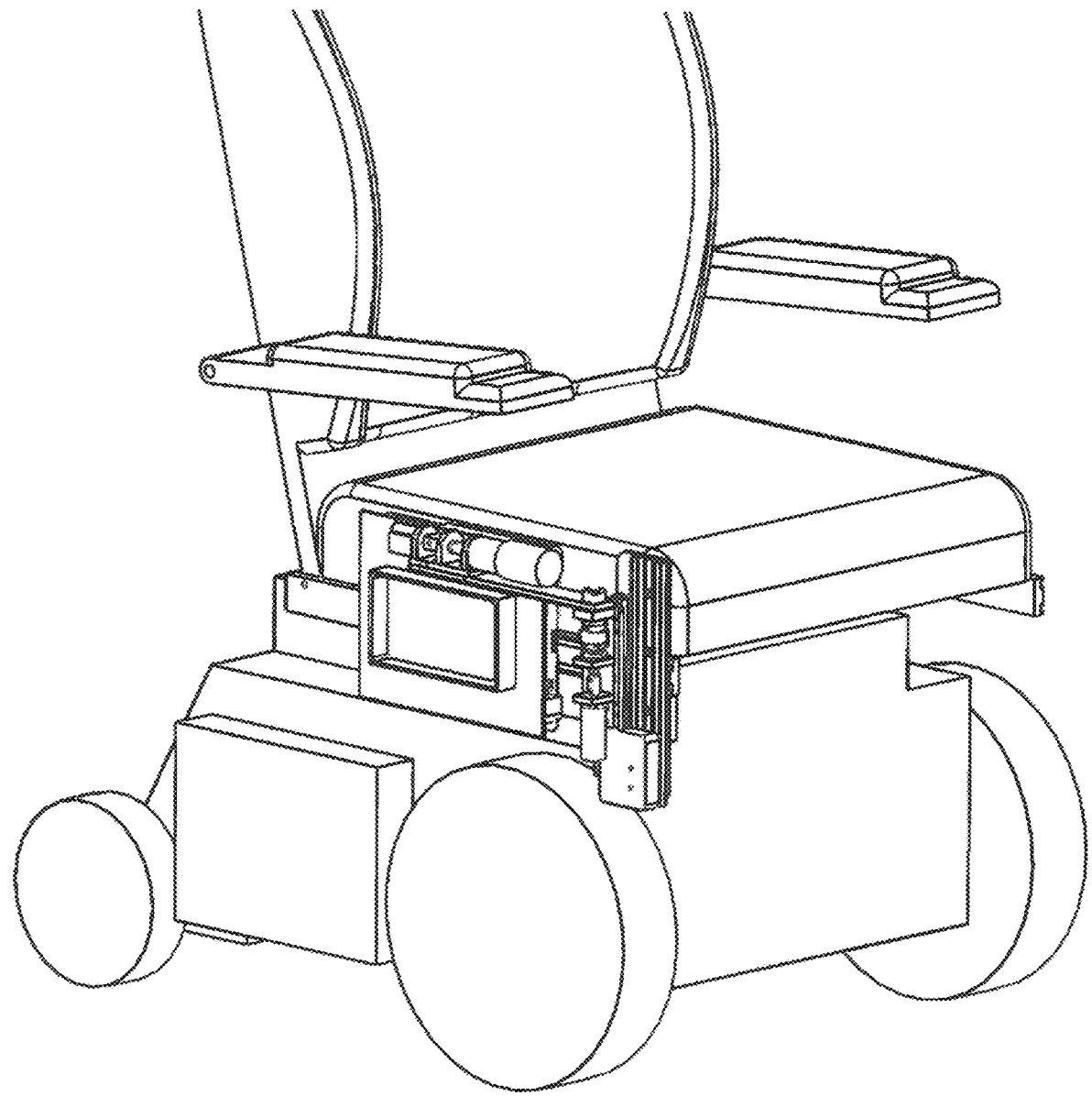
FIG. 26 illustrates an exemplary embodiment of the motorized mount of the present disclosure coupled to a wheelchair, wherein the motorized mount is in a fully retracted position with the railing system mounted in a vertical orientation.
Figure 27:
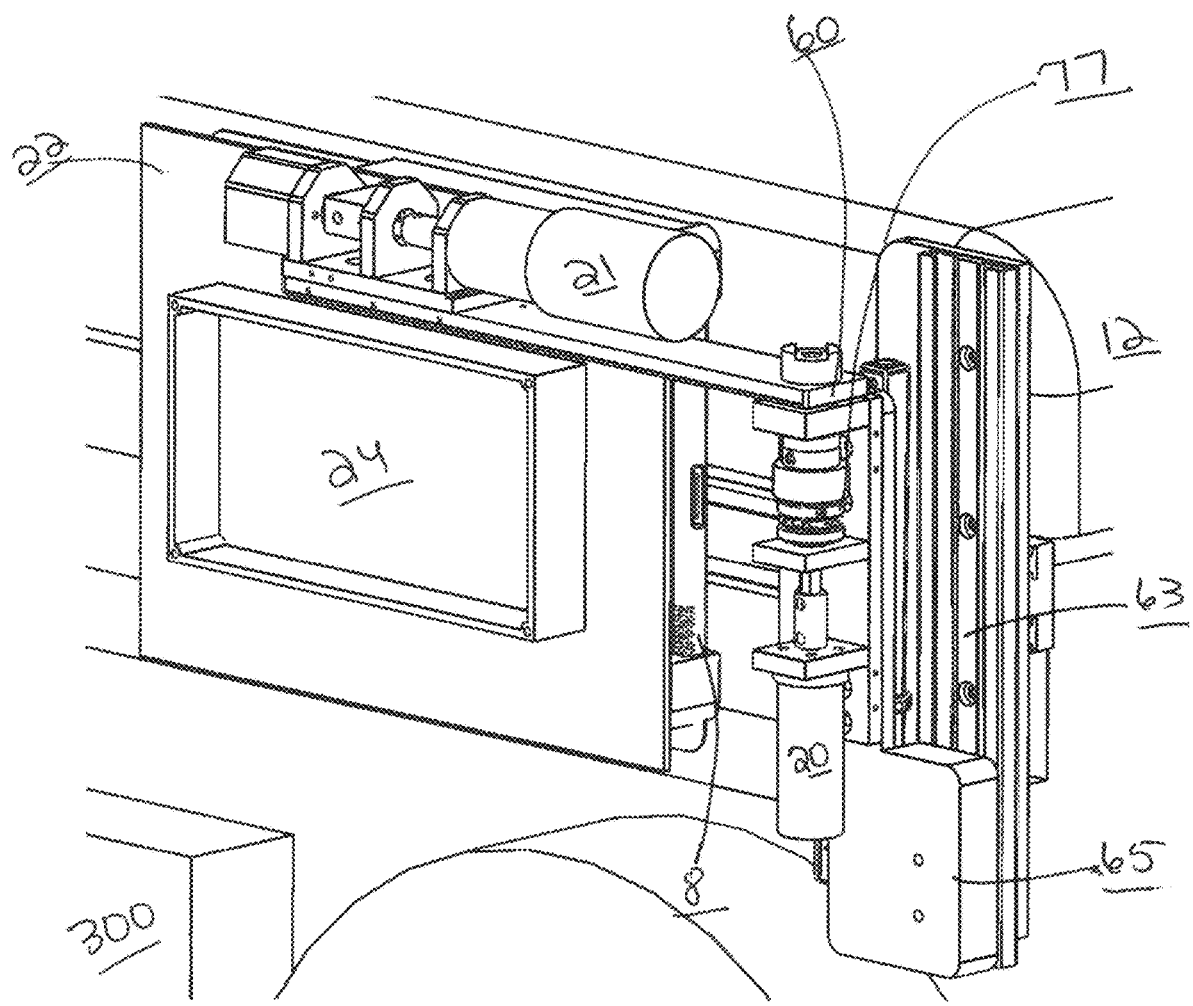
FIG. 27 illustrates a close-up perspective view of the motorized mount of FIG. 26.
Figure 28:
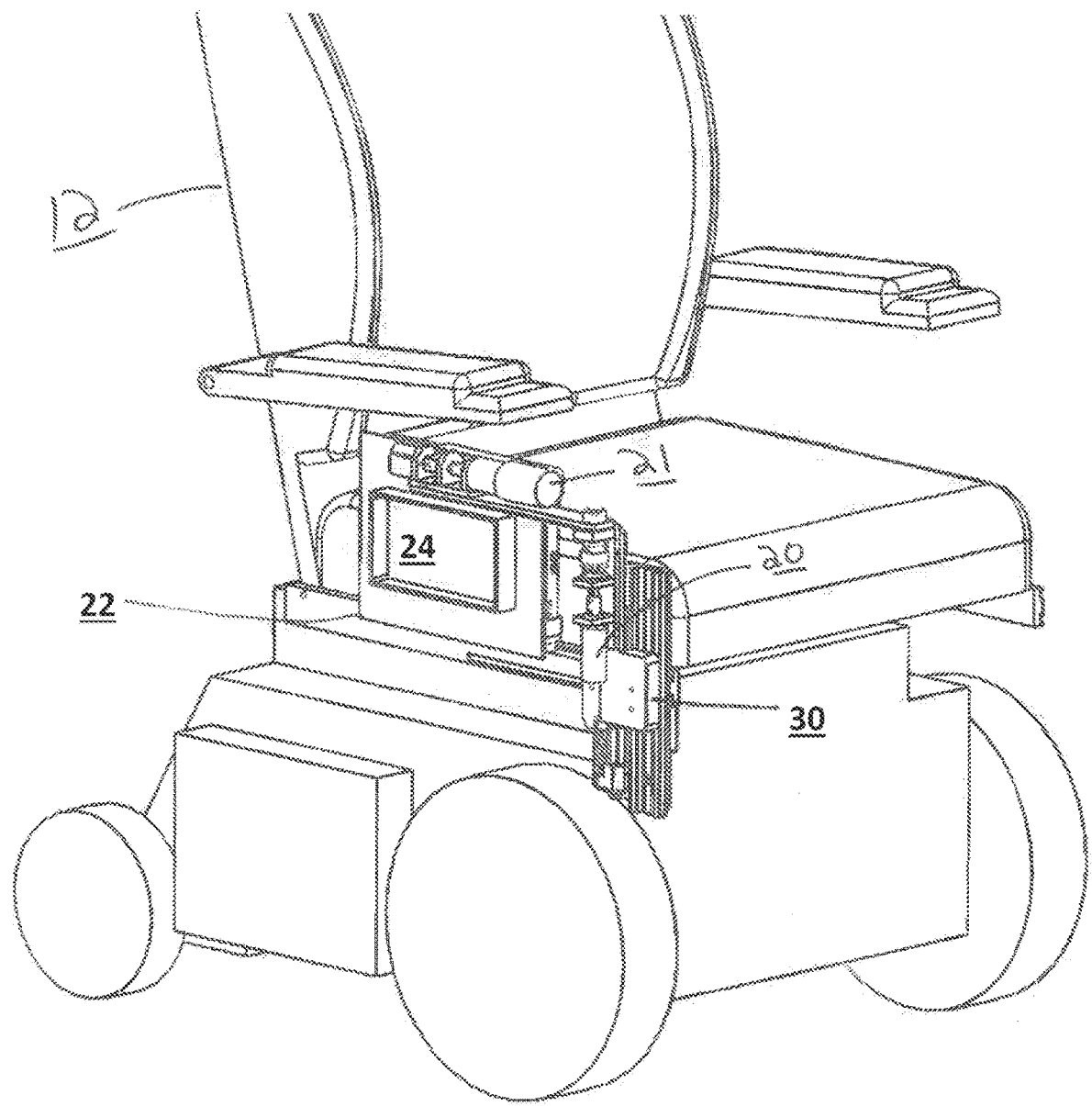
FIG. 28 illustrates an exemplary embodiment of the motorized mount of the present disclosure coupled to a wheelchair, wherein the motorized mount is in a first intermediate position with the railing system mounted in a vertical orientation.
Figure 29:
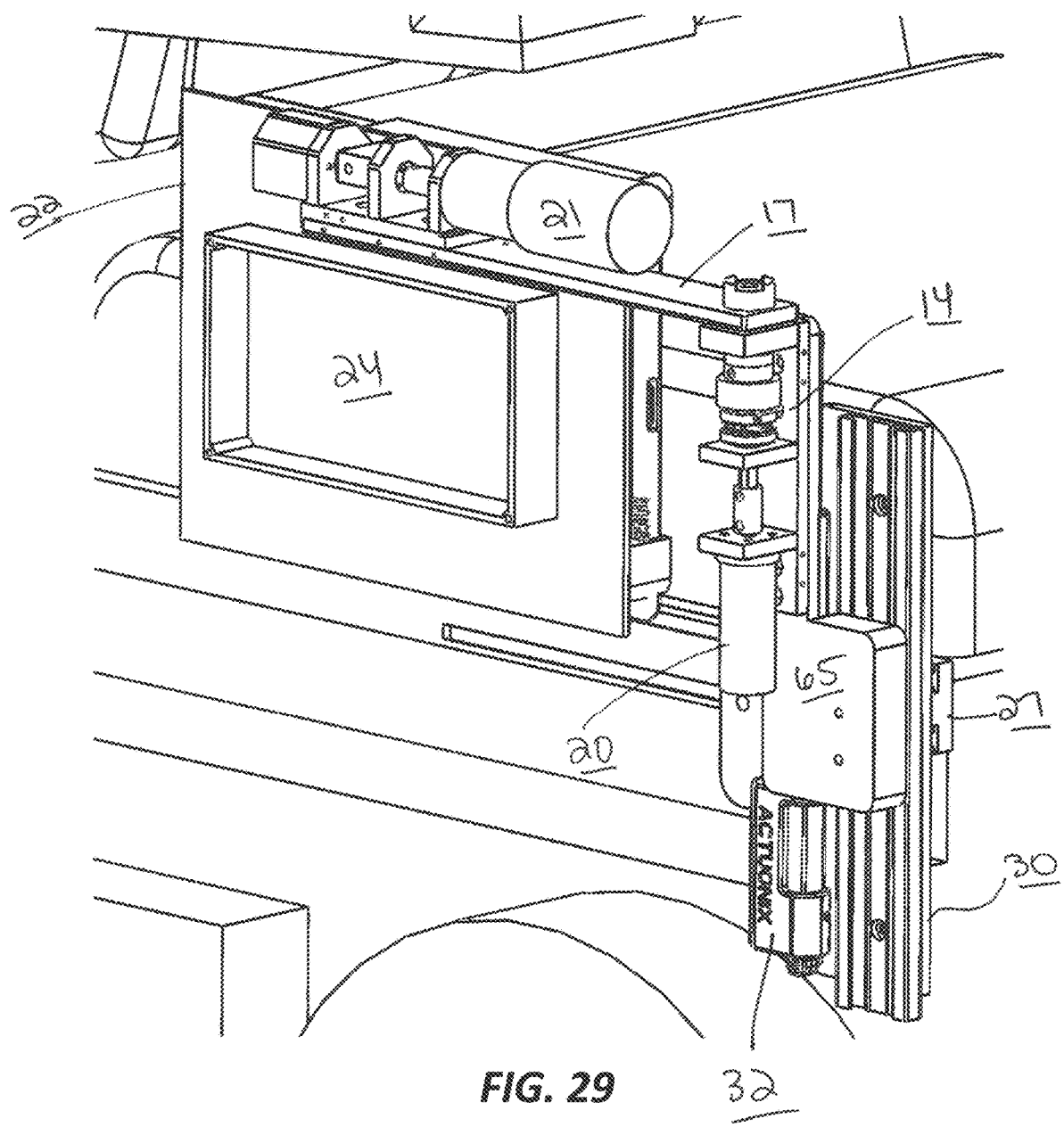
FIG. 29 illustrates a close-up perspective view of the motorized mount of FIG. 28.
Figure 30:
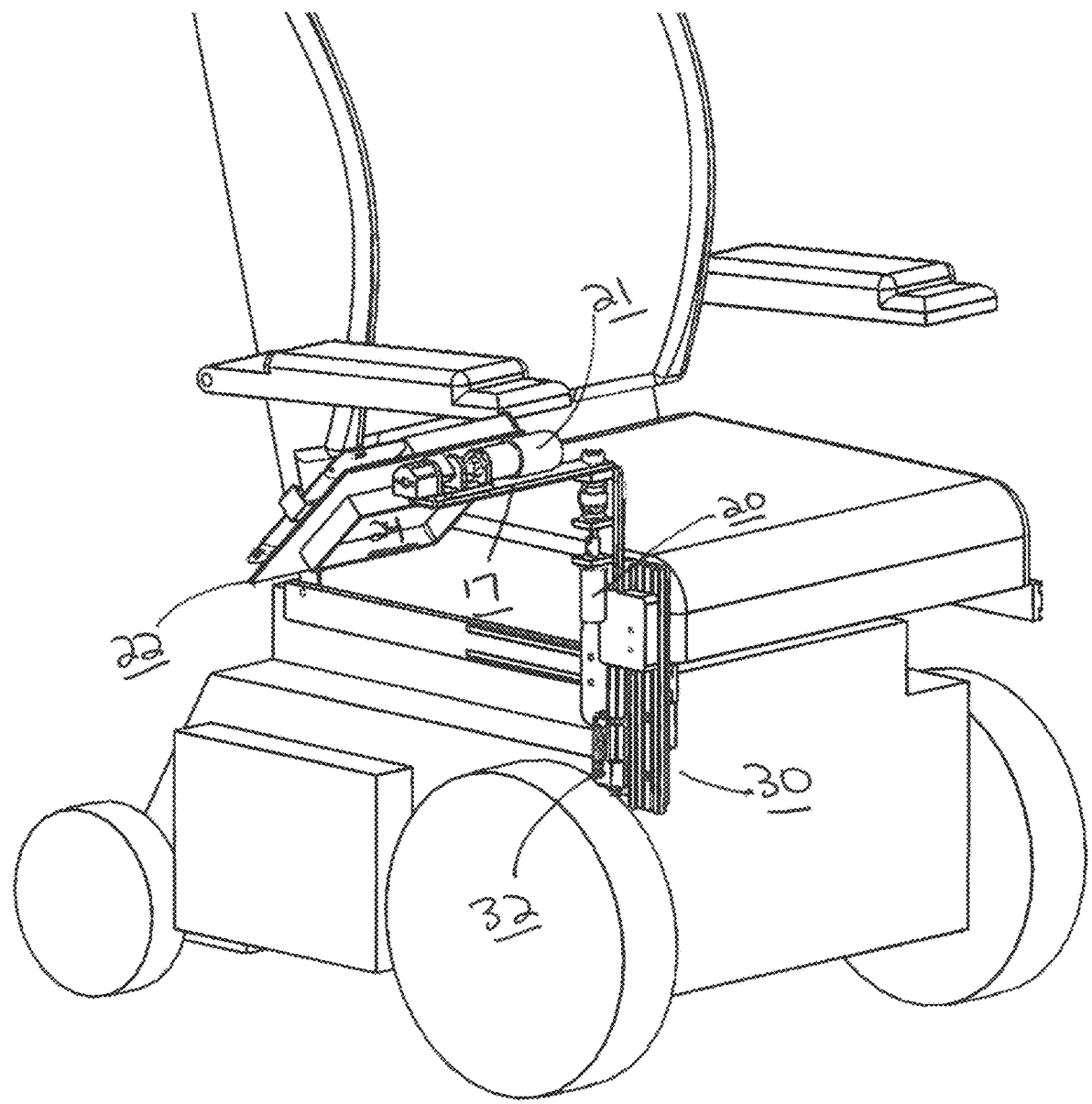
FIG. 30 illustrates an exemplary embodiment of the motorized mount of the present disclosure coupled to a wheelchair, wherein the motorized mount is in a second intermediate position with the railing system mounted in a vertical orientation.
Figure 31:
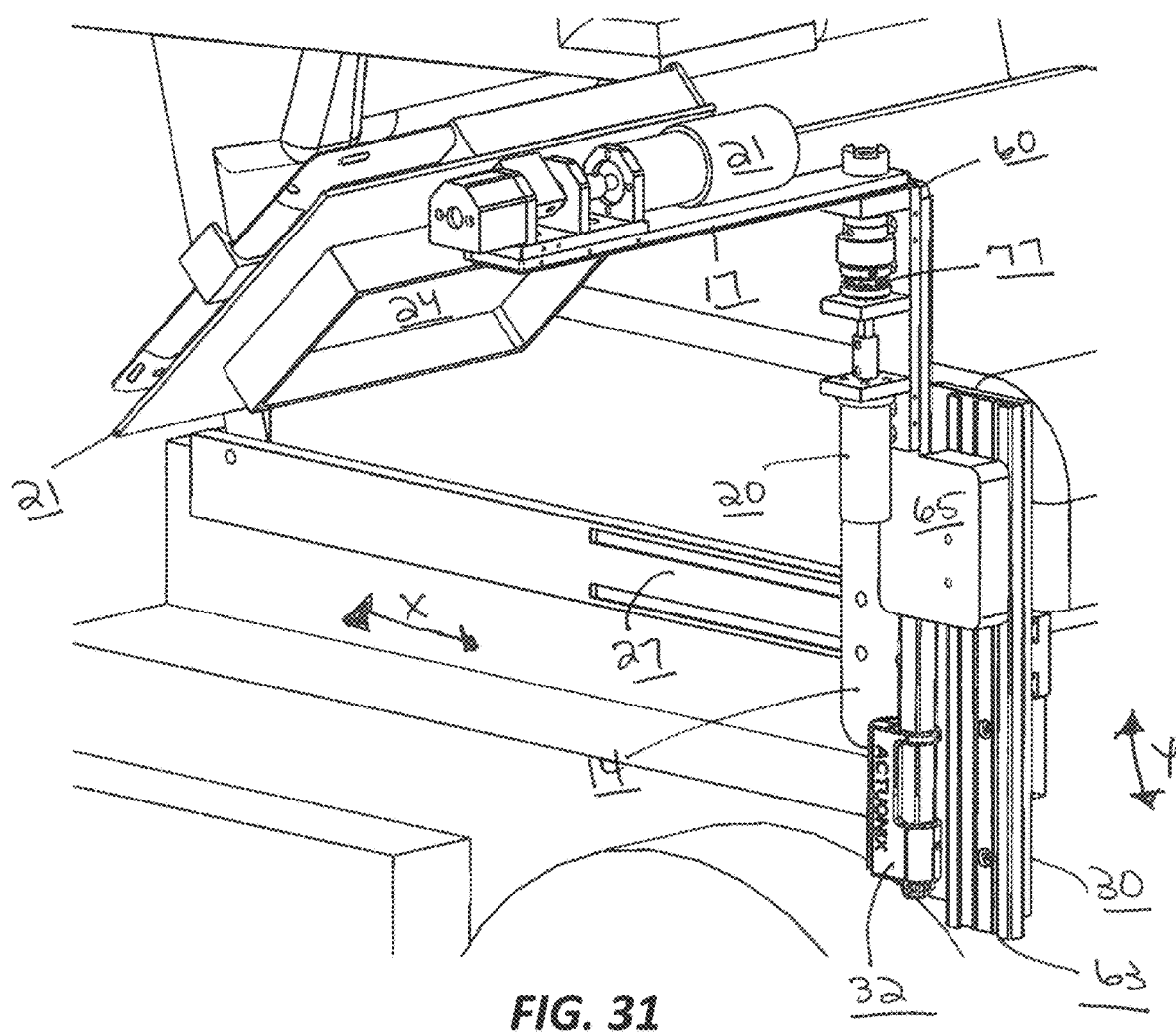
FIG. 31 illustrates a close-up perspective view of the motorized mount of FIG. 30.
Figure 32:
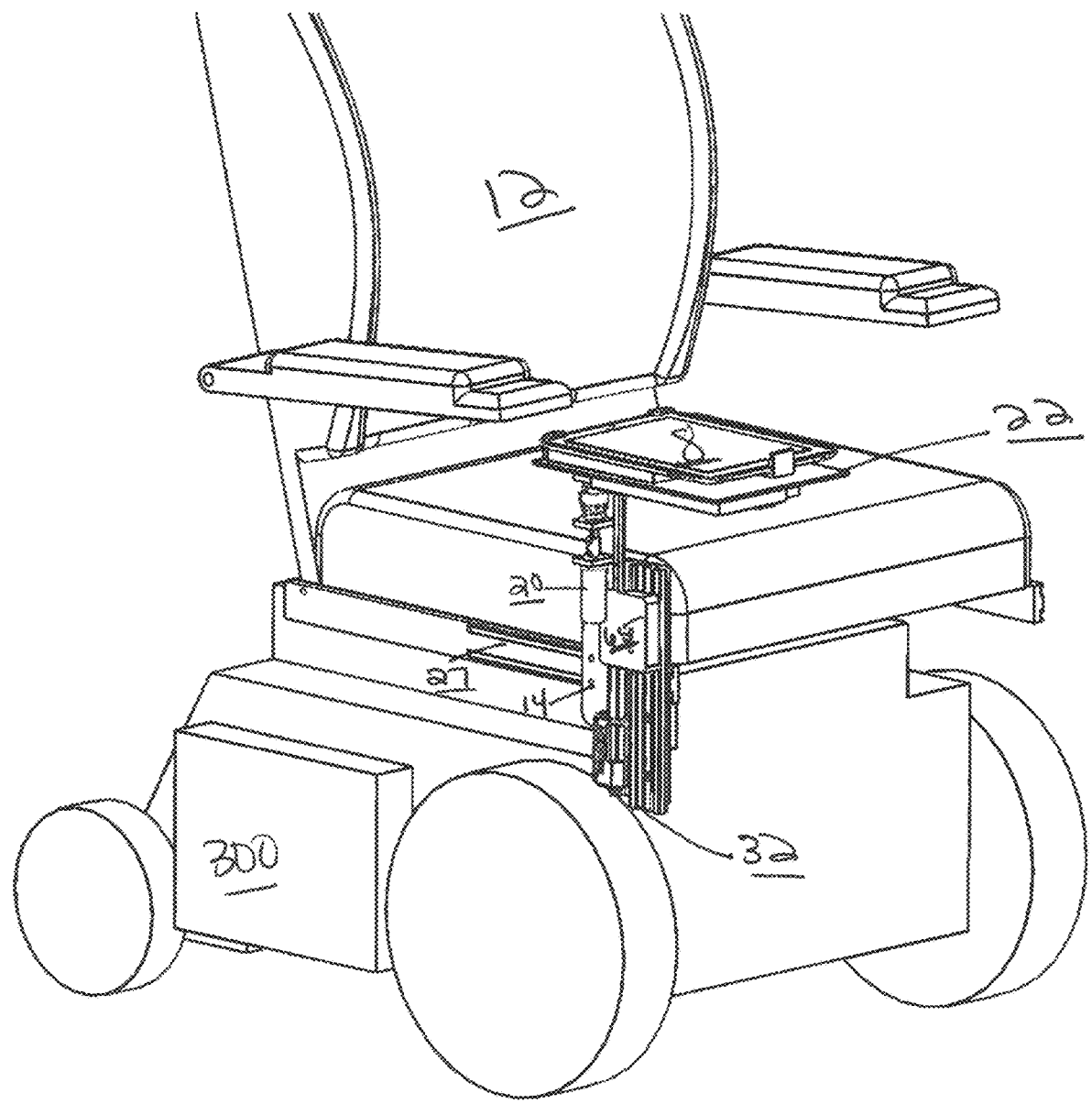
FIG. 32 illustrates an exemplary embodiment of the motorized mount of the present disclosure coupled to a wheelchair, wherein the motorized mount is in a third intermediate position with the railing system mounted in a vertical orientation.
Figure 33:
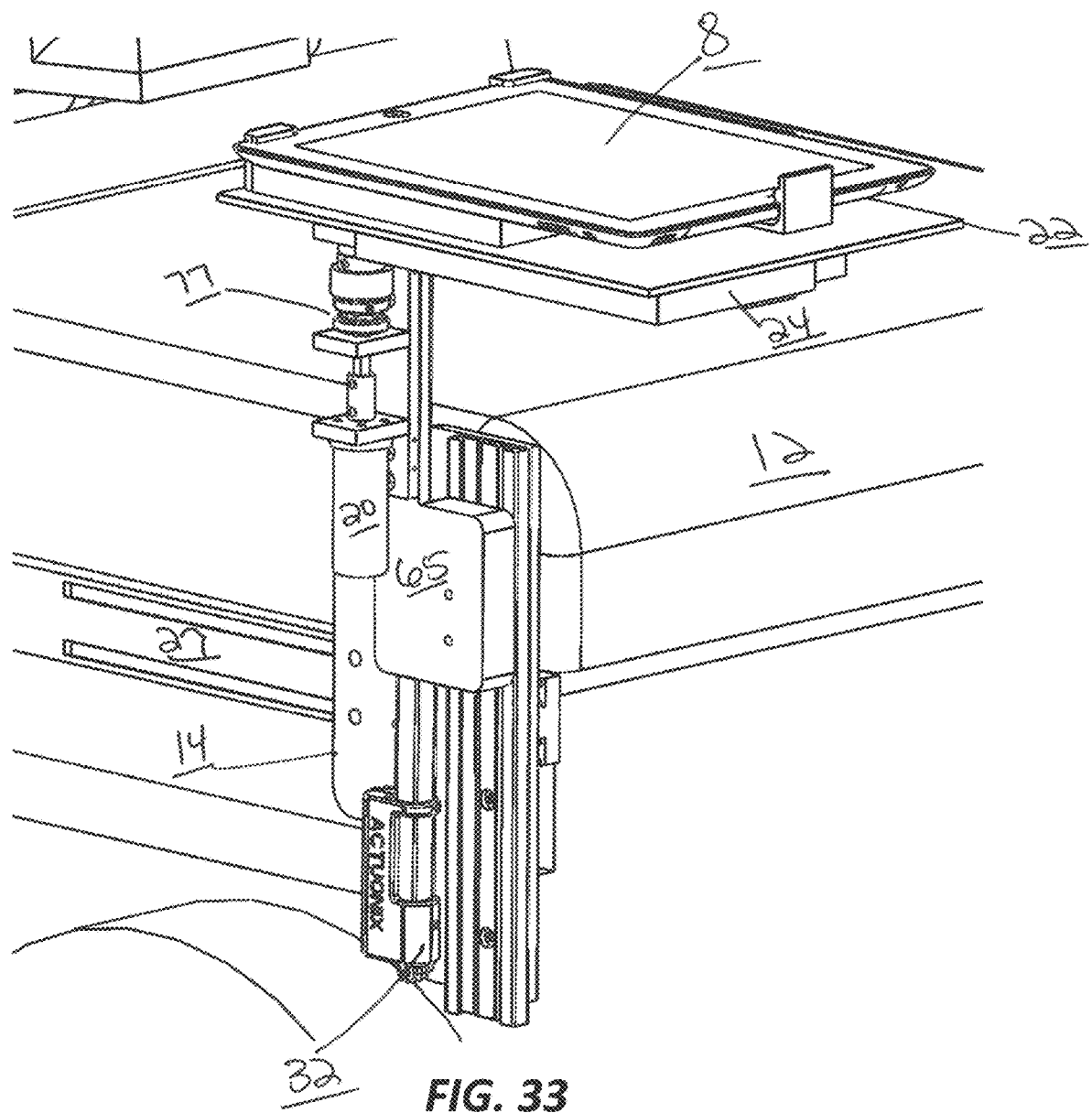
FIG. 33 illustrates a close-up perspective view of the motorized mount of FIG. 32.
Figure 34:
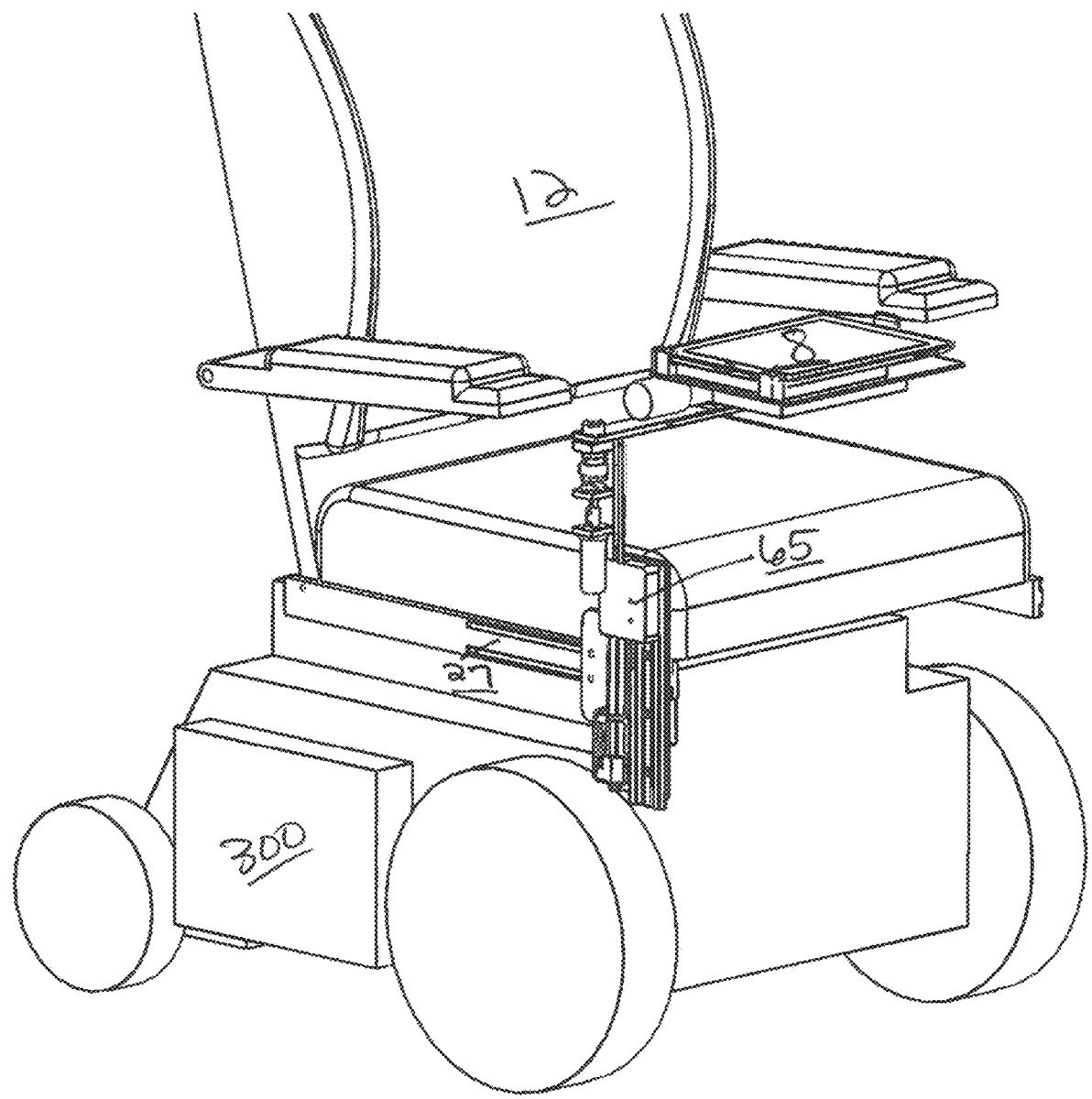
FIG. 34 illustrates an exemplary embodiment of the motorized mount of the present disclosure coupled to a wheelchair, wherein the motorized mount is in a fourth intermediate position with the railing system mounted in a vertical orientation.
Figure 35:
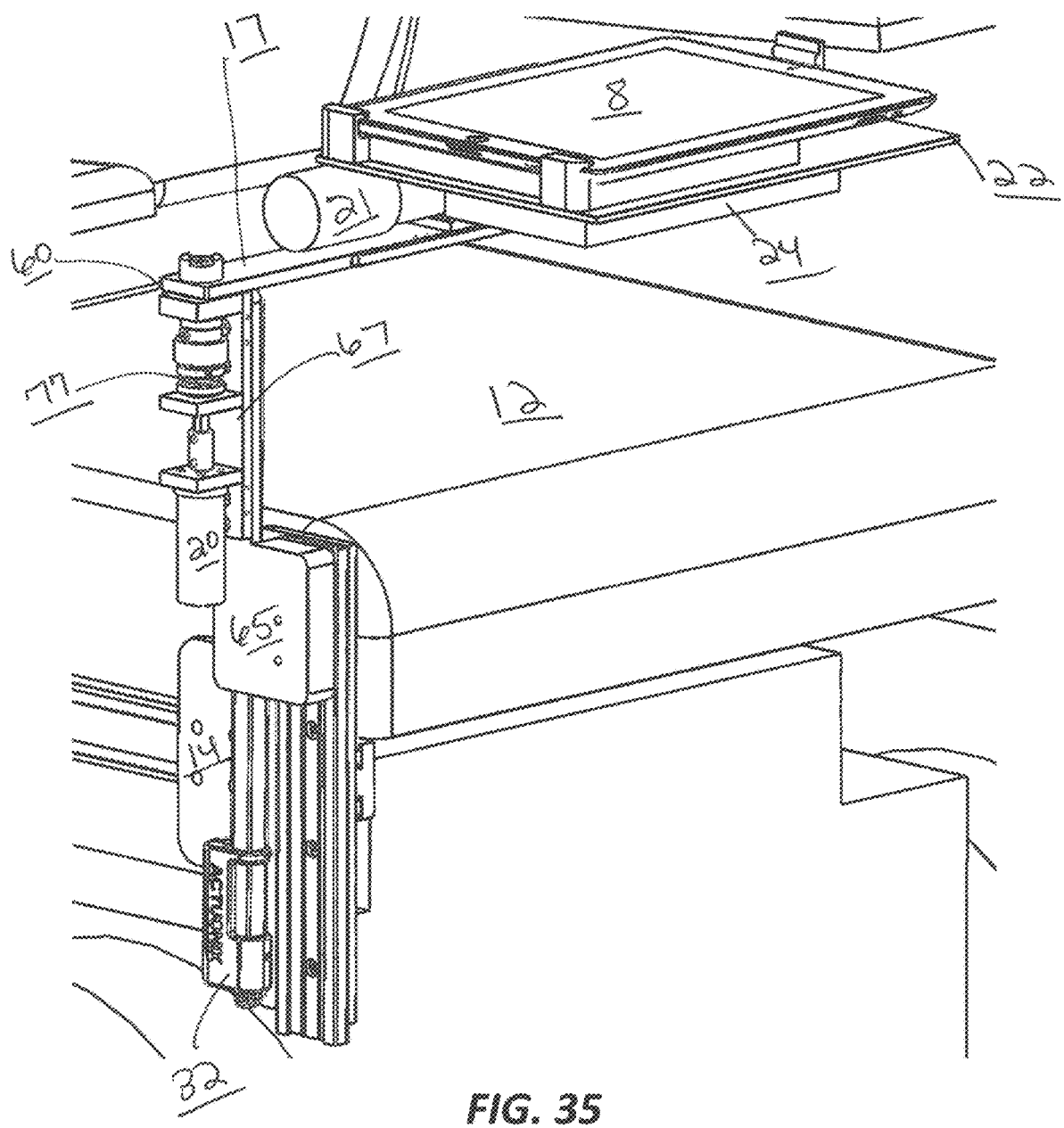
FIG. 35 illustrates a close-up perspective view of the motorized mount of FIG. 34.
Figure 36:
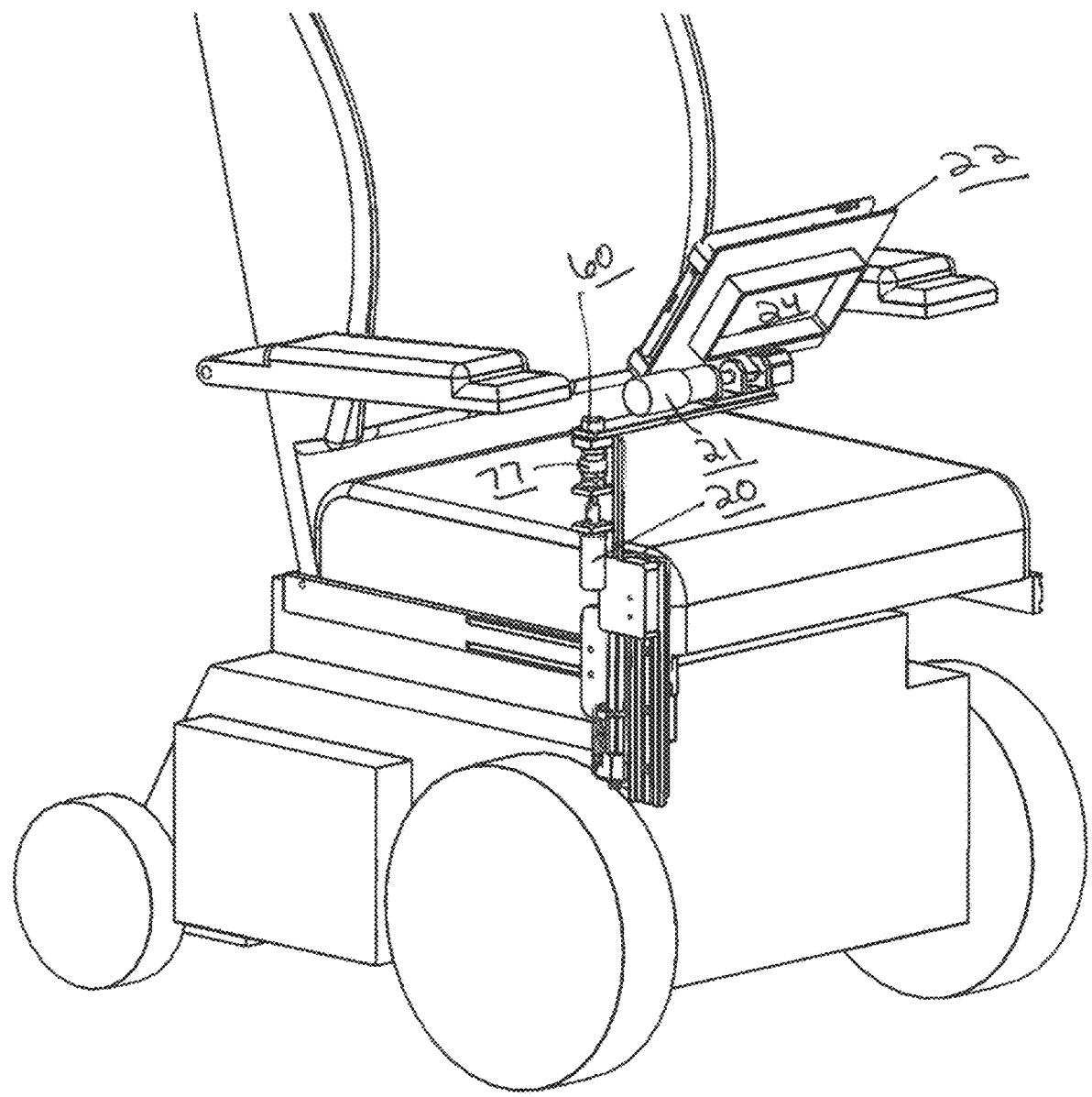
FIG. 36 illustrates an exemplary embodiment of the motorized mount of the present disclosure coupled to a wheelchair, wherein the motorized mount is in a fully retracted position with the railing system mounted in a vertical orientation.
Figure 37:
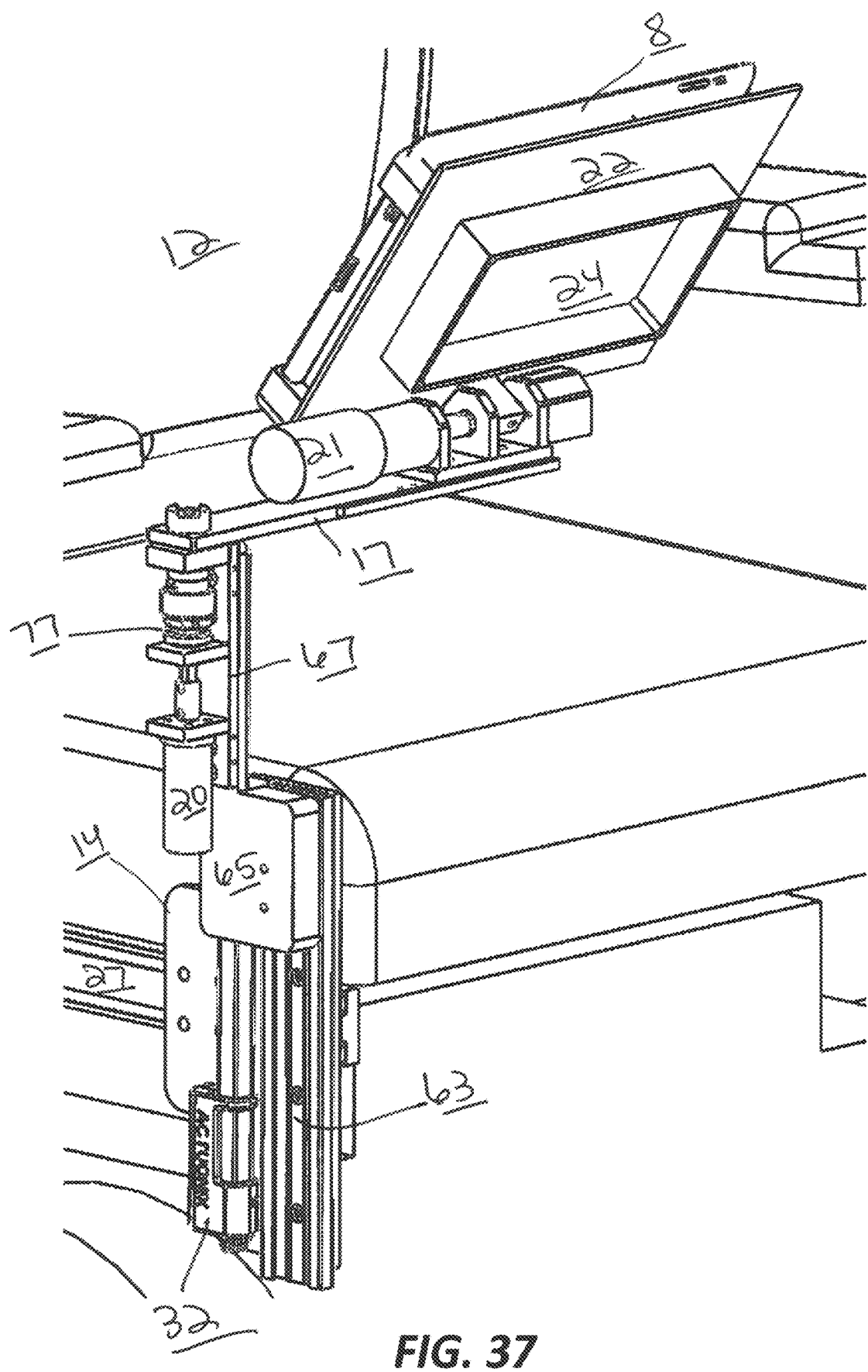
FIG. 37 illustrates a close-up perspective view of the motorized mount of FIG. 36.

FIGS. 26-37 illustrate a further embodiment wherein the four-bar linkage is replaced with a vertically adjustable sliding assembly 30 (see FIG. 29) which is driving by a linear actuator 32. The sliding assembly 30 can be coupled to the rail 27 using the attachment assembly 14, which in some embodiments can house the sliding assembly. The vertically adjustable sliding assembly 30 can further include a second rail 63 and a mounting bracket, wherein the mounting bracket 65 is coupled to linear actuator 32. The mounting bracket 65 can be coupled to or include and extension bracket 67 that allows for the first motor 20 mounted to it to provide a pivot of the arm 17 at the hinge 60. FIGS. 26 and 27 show the motorized mount in a stored position, with the top edge of the mount 10 positioned below the seating surface. As shown in FIGS. 28 and 29, the linear actuator 32 may first be activated by the control assembly 24 to drive the sliding assembly 30, thereby raising the arm 17 and the mounting assembly 22. As shown in FIGS. 30 and 31, in the next step, the first motor 20 and second motor 21 are driven to rotate the arm 17 (horizontally) and the mounting assembly 22 (vertically). As shown in FIGS. 32 and 33, the linear actuator 32 continues to drive the sliding assembly until a final height is reached, preferably above the user's thigh when seated in the seating system. The first motor completes rotation to 180 degrees and the second motor completes rotation to 90 degrees as shown. As shown in FIGS. 34 and 35, the first motor then rotates the arm 17 an additional 90 degrees to position the mounting assembly in front of the user and above their thigh. Lastly, the second motor may be further rotated up to an additional 90 degrees vertically based on user input from a control switch operatively coupled to the control unit to achieve a desired tilt or device viewing angle as shown in FIGS. 36 and 37.

Figure 38:
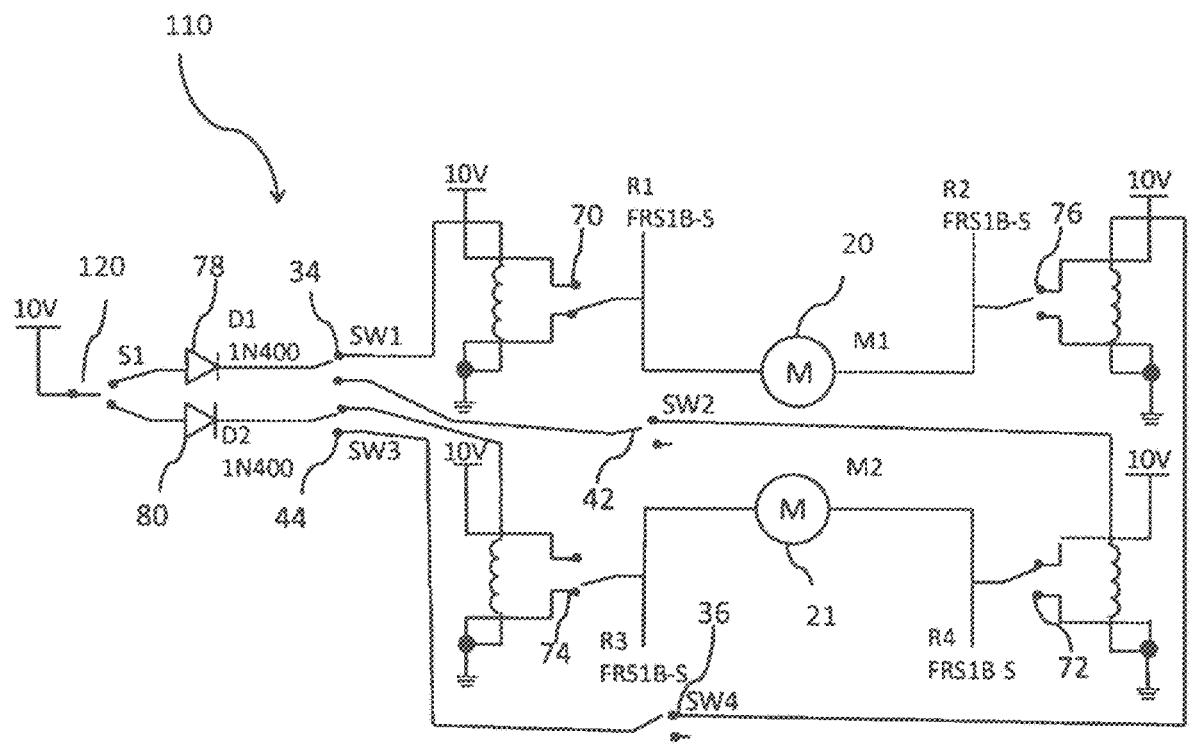
FIG. 38 is a schematic electrical diagram of an exemplary embodiment of the control system of the motorized mount of the present disclosure.

FIG. 38 illustrates an example of a circuit diagram 110 that may be used to control system of an exemplary embodiment of the present disclosure. A person having ordinary skill in the art will recognize that the circuit diagram may change depending on the various embodiments of the motorized mount and the coupled seating system. In one embodiment an input switch 120 is coupled to the first motor assembly and limit switches 34 and 36, and second motor assembly and limit switches 42 and 44 by relays. FIG. 38 illustrates relays 70, 72, 74, 76 that allow the first and second motors, 20 and 21, to run in both forward and reverse directions. Additionally, the input switch can be coupled to the actuator 32. The input switch 20, the first and second motors 20, 21, and the limit switches 34, 36, 42, 44 discussed above are all illustrated in FIG. 38. The motorized mount 10 also includes relays 70, 72, 74, 76 that allow the first and second motors 20, 21 to run in both forward and reverse directions. The input switch 20 is illustratively embodied as a momentary single pole double throw (SPDT) input switch 20 that controls whether the motorized mount 10 moves toward the retracted position, moves toward the deployed position, or remains neutral or an intermediate position. In other embodiments, the user might instead utilize a sip and puff, a brain-controlled interface, voice recognition, gesture recognition, a touch screen interface, and/or other commercial switches to control operation of the motorized mount 10. In any case, the user's input will control the articulating arm assembly motors via the relays 70, 72, 74, 76 and the limit switches 34, 36, 42, 44. When the arm assembly 17 is moving toward the deployed position (as illustrated across FIGS. 1A-1F) by the arm 17, the input switch 120 connects a diode 78 to the supply voltage (which may be 10 V to 24 V, as noted above).

Figure 39:
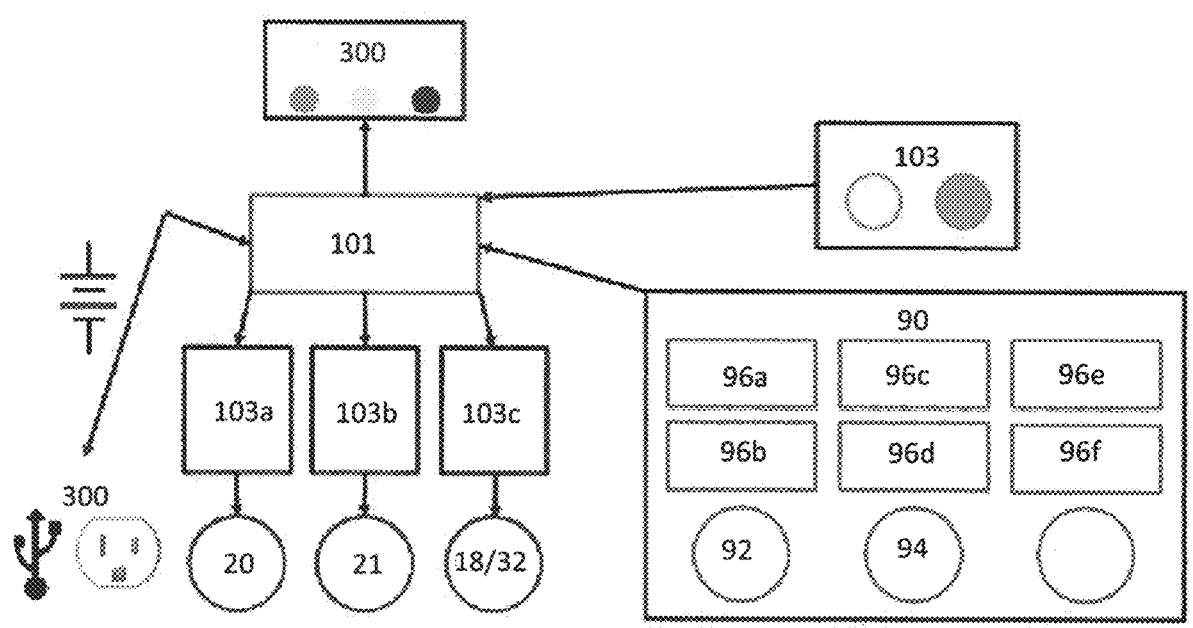
FIG. 39 is a diagram of a control system of the motorized mount of the present disclosure.

Similarly, the control unit 24 can include microcontroller communicatively coupled to motor driver(s) that allow the one or more motors, to run in both forward and reverse directions, which in turn can extend or retract the respective actuators or rotation assemblies. An input switch or motor driver may be communicatively coupled to a third motor assembly, and a motor driver, or limit switches and relays can allow for the motor to drive one or more gear/motor assemblies to turn the table support arm 17 rotationally 360 degrees along an axis using the second motor 21. A second motor assembly can turn the arm 17 along an axis about 360 degrees, or about 270 degrees, or about 180 degrees. In one exemplary embodiment, the mounting assembly 22 can be coupled proximate to the end of the arm 17. Similarly, the arm 17 can extend the entire length of the table portion to provide additional support. In yet another exemplary embodiment, the mounting assembly 22 can have an integrated support arm that can be directly coupled to the second motor assembly 21. As shown in FIG. 39, an electrical assembly 200 of the control unit 24 can include microcontroller(s) 101, sensor(s) 103, motor driver(s) 105, and motors and/or actuators 20, 21, 32 to control the various elements and functions of the motorized mount 10. The system can further communicate and/or be electrically coupled to a user input controller system 90. FIG. 39 illustrate an exemplary embodiment of a circuit diagram(s) of the electrical assembly 200 of an exemplary embodiment of the motorized mount apparatus of the present disclosure.

The control system 90 can have a memory 92 and microprocessor 94, where the memory can store one or more pre-set configurations. The configurations can be manually altered or set depending upon the desired positions by a user, using one or more control switches 96. The switches 96 can be configured to pre-set positions and/or allow for manual manipulation of the motorized mount. Similarly, at least three pre-set positions can be set including a first position wherein the mounting assembly 22 is angled up facing a user in a seating assembly 12. A second pre-set position can be a "stowed" position, wherein the mounting assembly 22 lies parallel to and proximate to the side rail 27 to remain out of the way from the front of the user if the user does not desire to use the mounting assembly 22 or device or to move in and out of the seating assembly 12. In some embodiments, the attachment assembly 14 can be coupled to a linear actuator to allow for electronic driven movement of the attachment assembly 14 along the horizontal axis formed by rail 27. This could allow a user to electronically move the assembly in a horizontal manner when the assembly was fully deployed. Alternatively, the attachment assembly 14 can be manually adjusted horizontally along the axis using any other suitable means. A third pre-set position can include a traditional position wherein the table surface 30 is facing upwards and the user is in a reclined but not fully supine position. Additionally, the one or more sensors 103 can be used to optimize the position of the table portion relative to the user's position in the bed or recliner 20. Additionally, the system 90 can use various types of user feedback 300 to optimize the positioning of the mounting assembly relative to the use.

The mechanism will move safely by mechanically and electrically limiting the maximum transmission force and using one or more sensors to detect contact with the environment so it will not be able to cause damage to the user, bystanders, or nearby equipment. In one exemplary embodiment, a torque limiter 77 or mechanical slip clutch can be coupled to one or more of the motors to limit the amount of force applied by the motors. A motor 20 can rotate the arm 17 360° around an axis. A shaft coupler can couple the support arm 17 to the drive shaft 79. The drive shaft can freely rotate within one or more bearing units 79. The bearings can be any suitable type of roller bearing, such as ball bearings, roller bearings or bushings instead. The shaft 79 can be coupled to motor 21 via a mechanical SLIP clutch torque limiter 77. The torque limiter is able to save space, however, other shaft couplers could work. In some exemplary embodiments, the motor can use an absolute rotary encoder 81 at the output after the torque limiter 77 since the torque limiter can decouple the motor 21 from the output.

Alternatively, if a torque limiter is not included, a motor with a built-in rotary encoder can be used.

Similarly, a pressure sensor can be used to monitor force applied to an external object. Position sensors (e.g. potentiometer or similar linear or rotary encoder) can be used for each degree of freedom to control the systems 10 position and speed and prevent unintended operation. Some exemplary embodiments of the motorized mount assembly 10 can use IR break beam sensors along with IR reflectors to help prevent portions of the assembly from coming into direct contact with a user. A user can easily program pre-set positions for rapid automatic positioning, such as automatically positioning the device from the retracted to deployed positions. The sensors can detect proximity or contact with the user, bystanders, or other proximate elements in the surrounding environment to prevent or minimize unintentional contact.

Figure 1B:
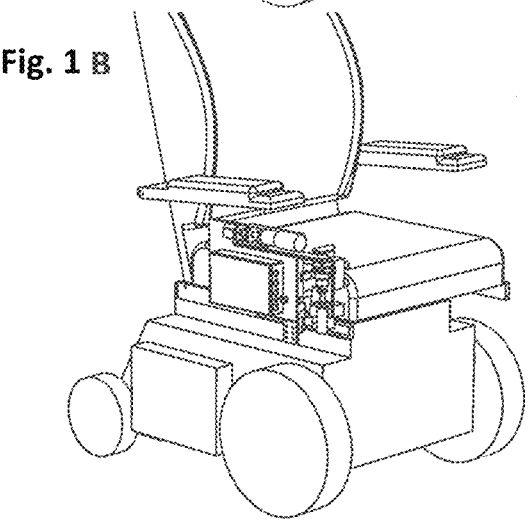
FIG. 1B illustrates an exemplary embodiment of the motorized mount of the present disclosure in a first intermediate position.
Figure 1E:
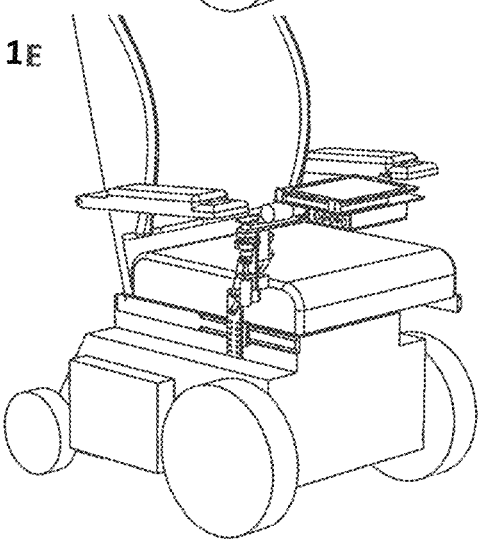
FIG. 1E illustrates an exemplary embodiment of the motorized mount of the present disclosure in a fourth intermediate position.
Figure 1C:
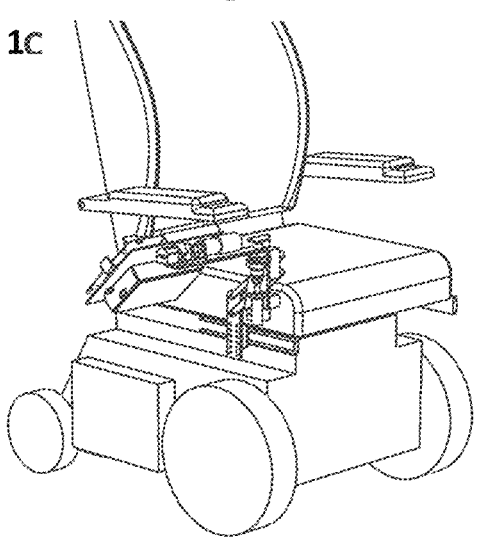
FIG. 1C illustrates an exemplary embodiment of the motorized mount of the present disclosure in a second intermediate position.
Figure 1F:
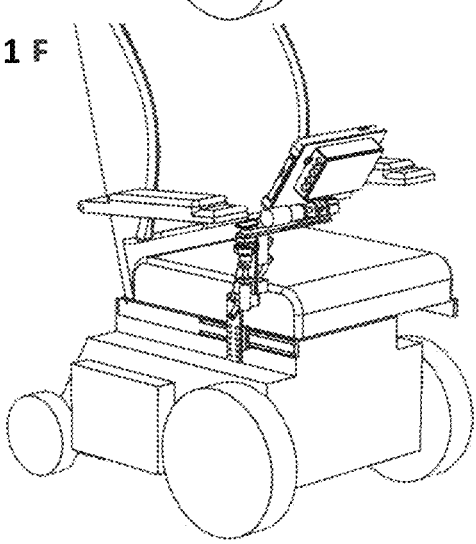
FIG. 1F illustrates an exemplary embodiment of the motorized mount of the present disclosure in fully deployed position.
Figure 2:
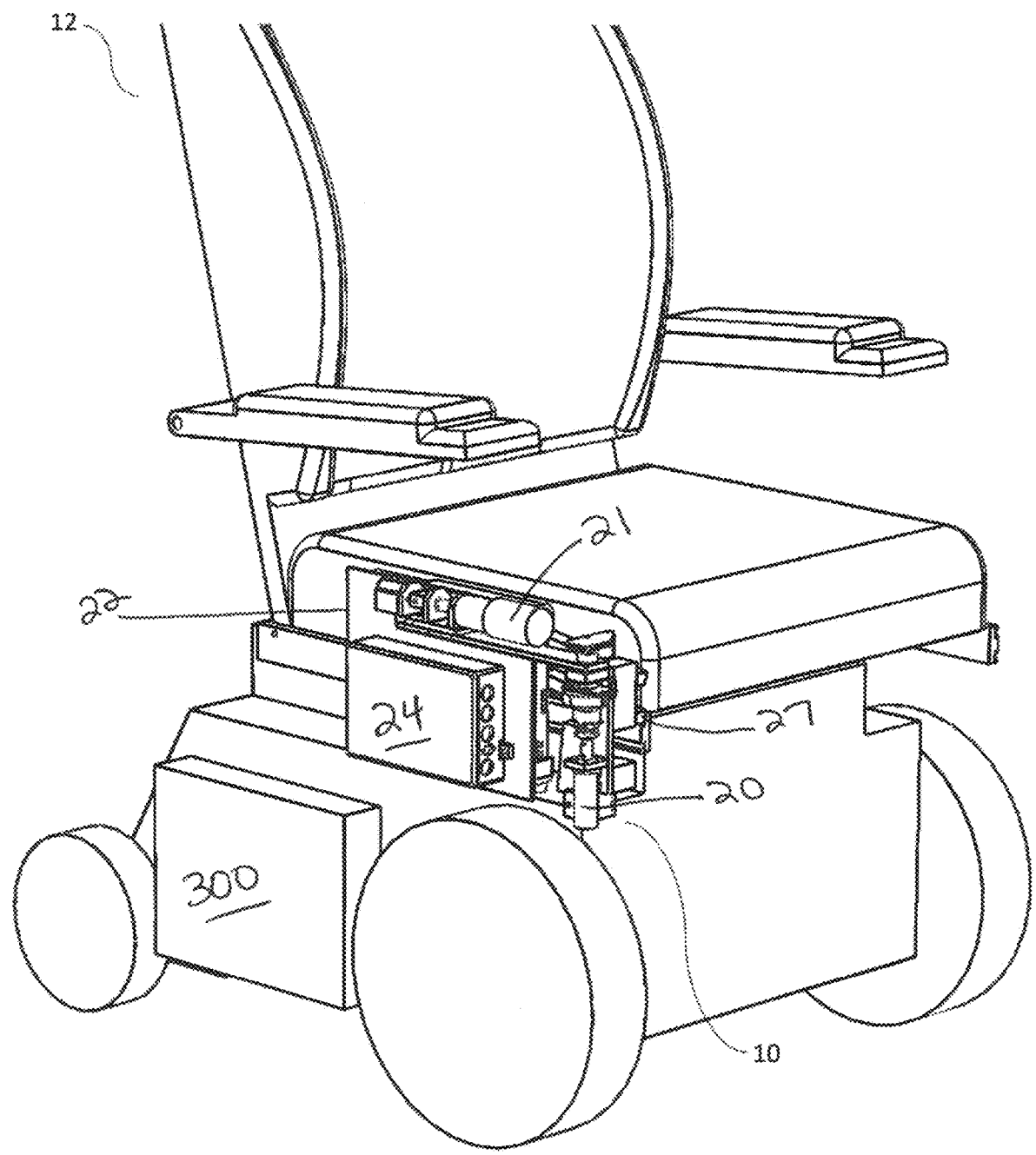
FIG. 2 illustrates an exemplary embodiment of the motorized mount of the present disclosure coupled to a wheelchair.
Figure 3:
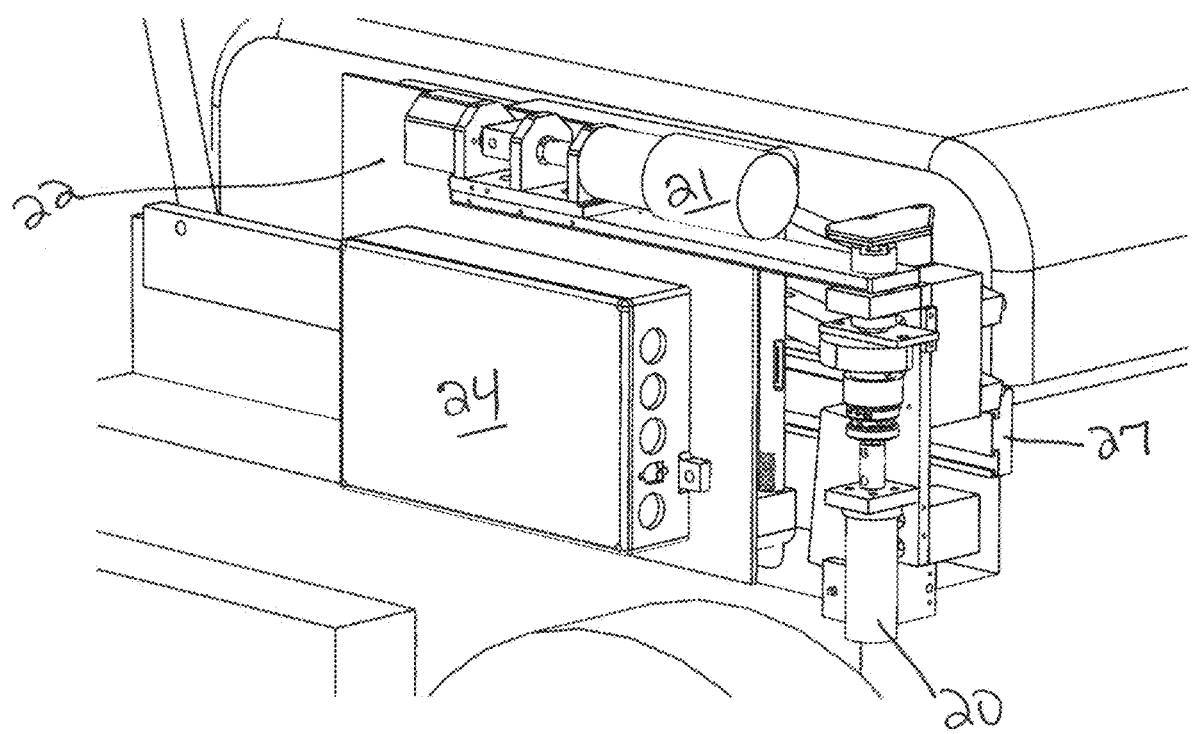
FIG. 3 illustrates a close-up perspective view of the motorized mount of FIG. 2.
Figure 4:
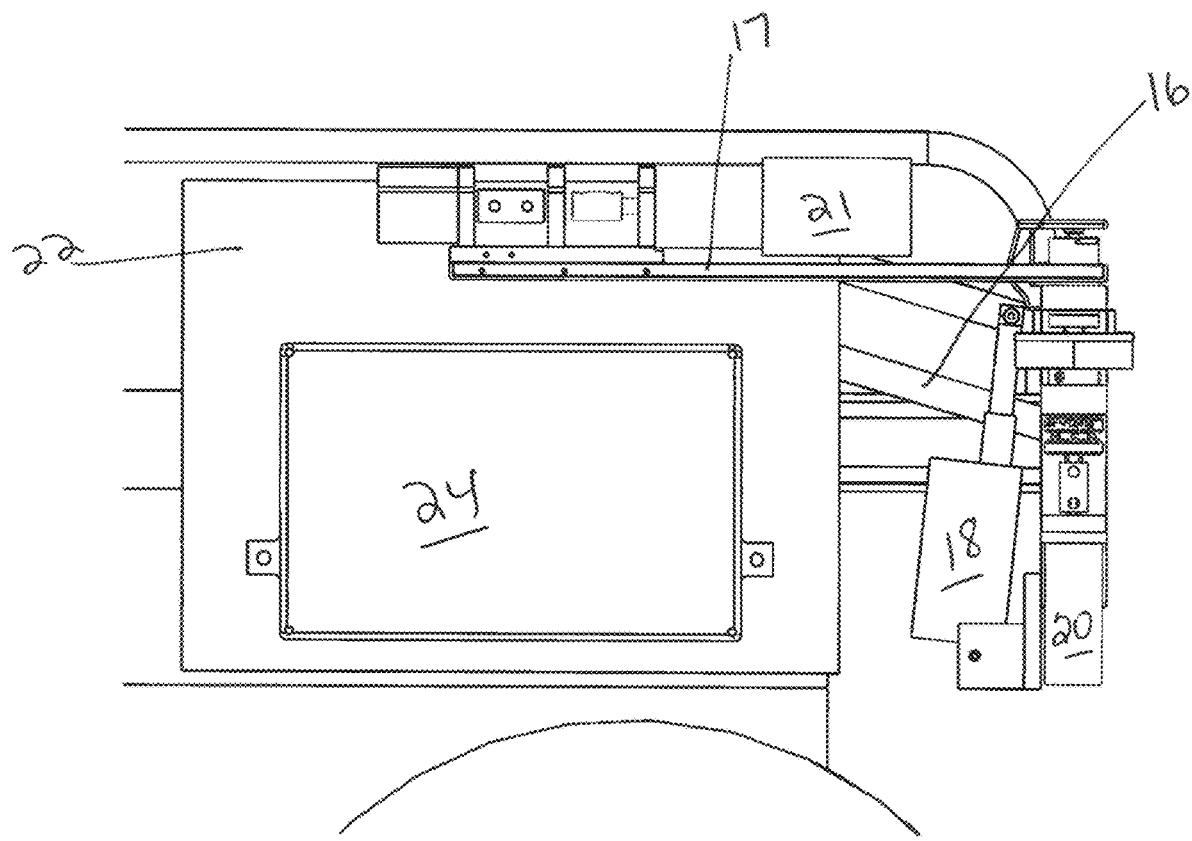
FIG. 4 illustrates a side view of the motorized mount of FIG. 2.
Figure 5:
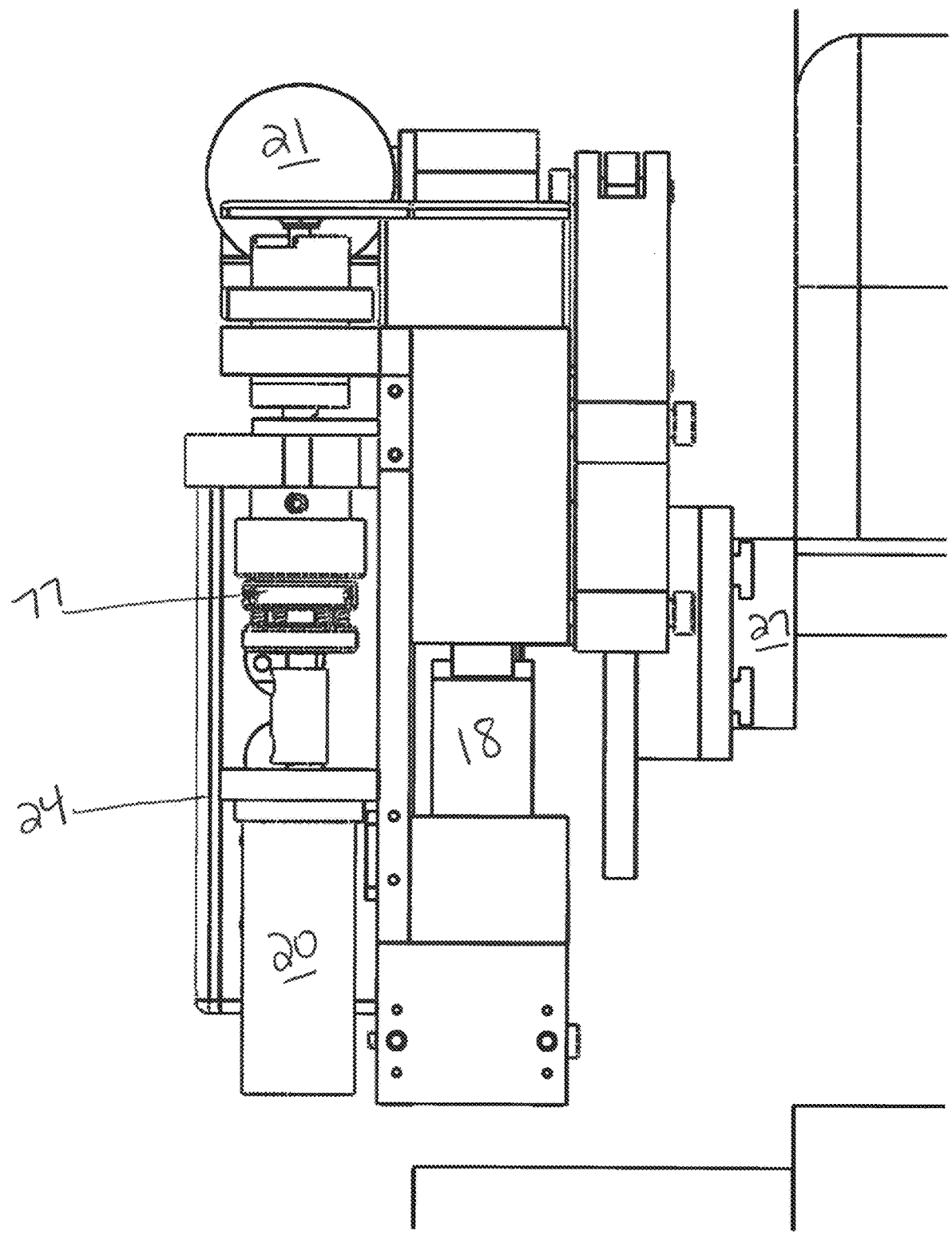
FIG. 5 illustrates a front view of the motorized mount of FIG. 2.
Figure 6:
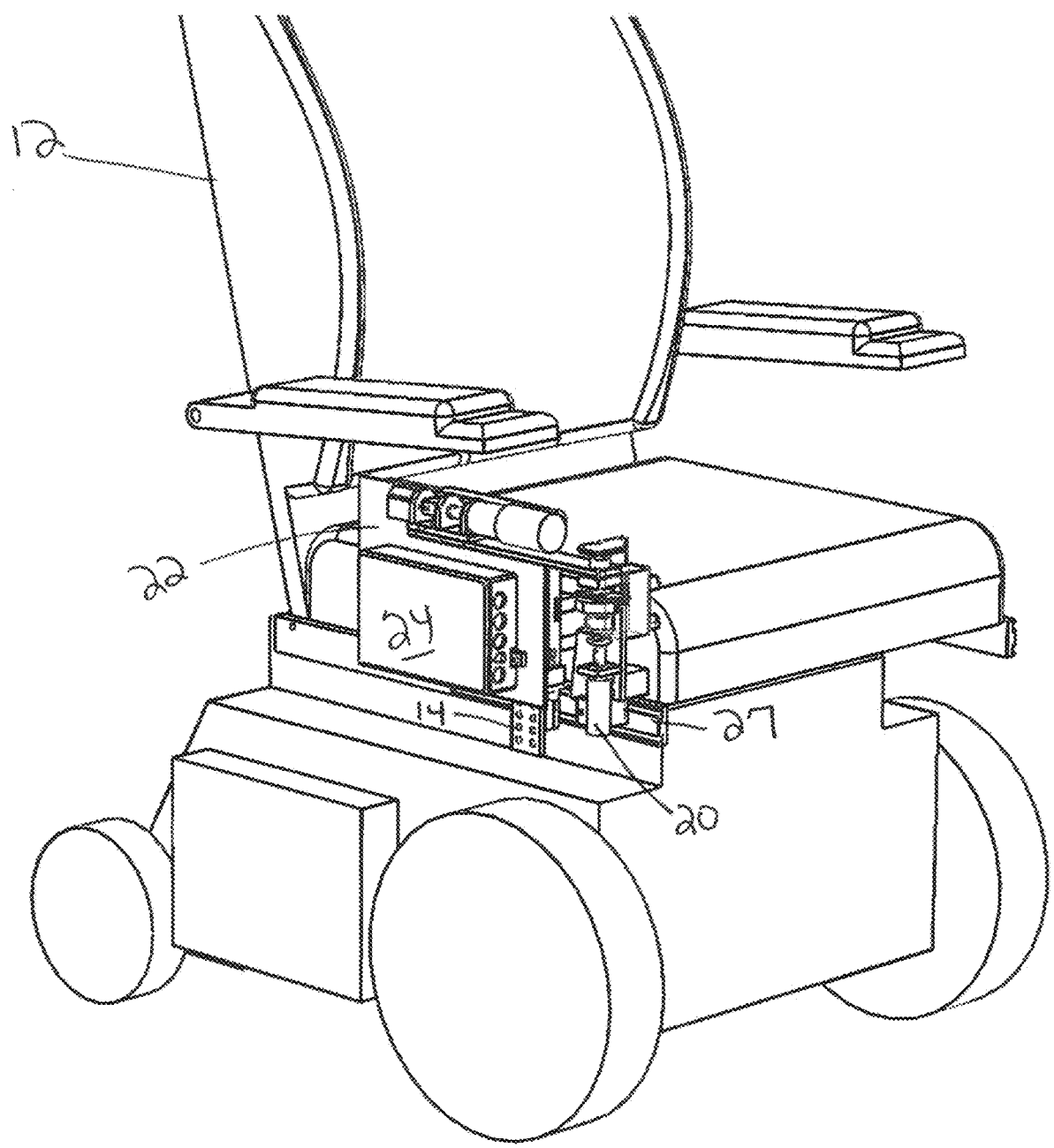
FIG. 6 illustrates an exemplary embodiment of the motorized mount of the present disclosure coupled to a wheelchair, wherein the motorized mount is in a first intermediate position.
Figure 7:
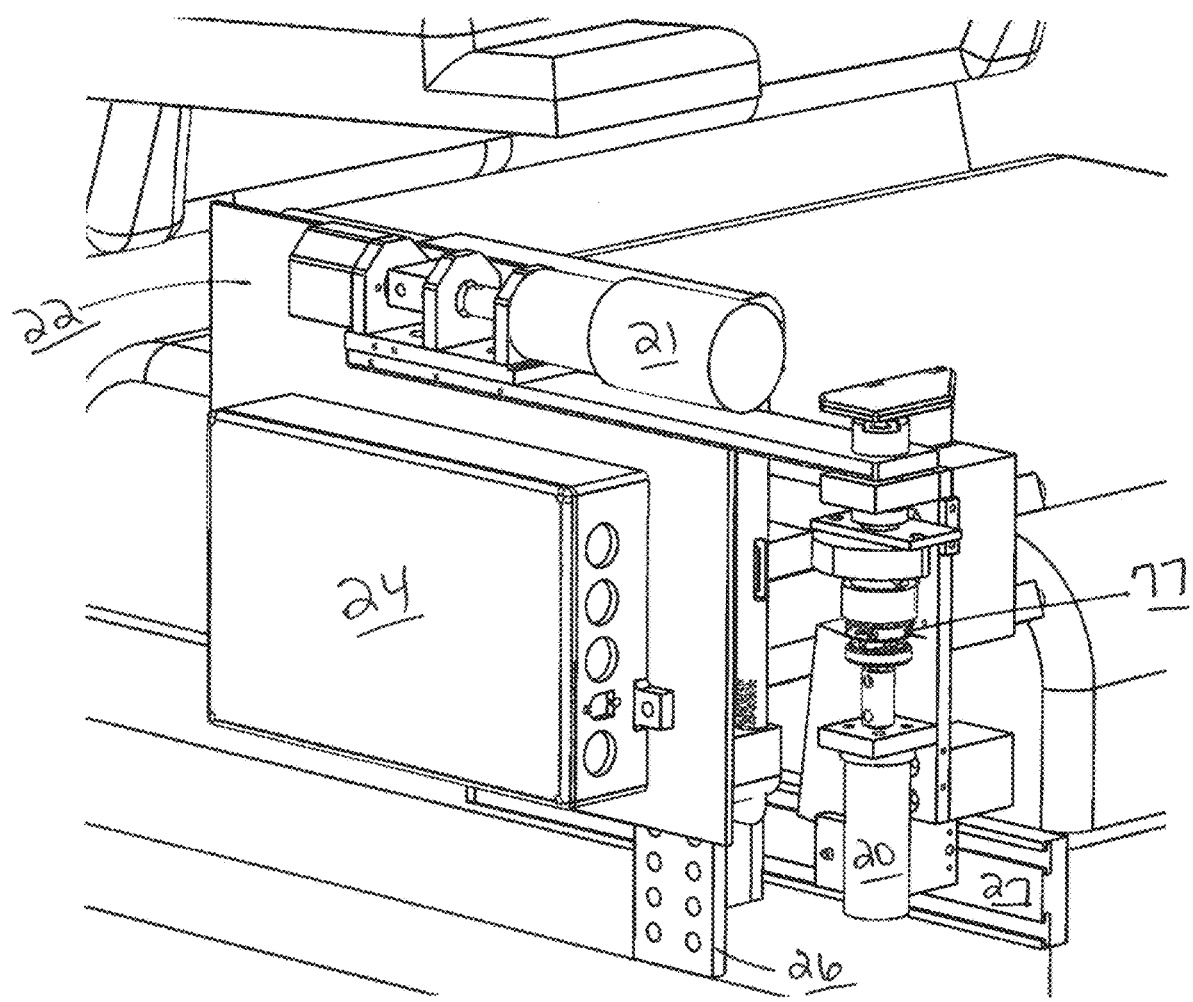
FIG. 7 illustrates a close-up perspective view of the motorized mount of FIG. 6.
Figure 8:
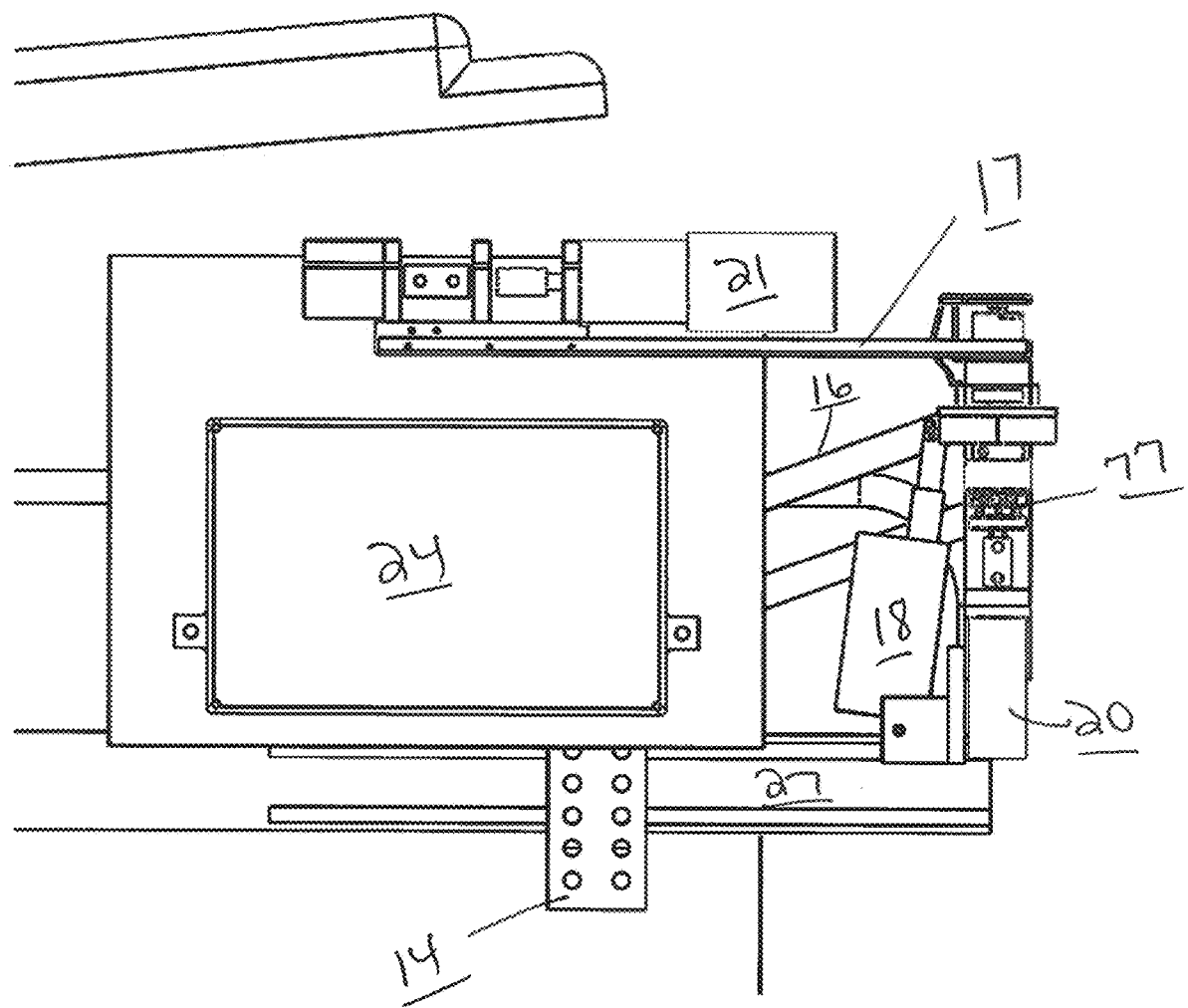
FIG. 8 illustrates a side view of the motorized mount of FIG. 6.
Figure 9:
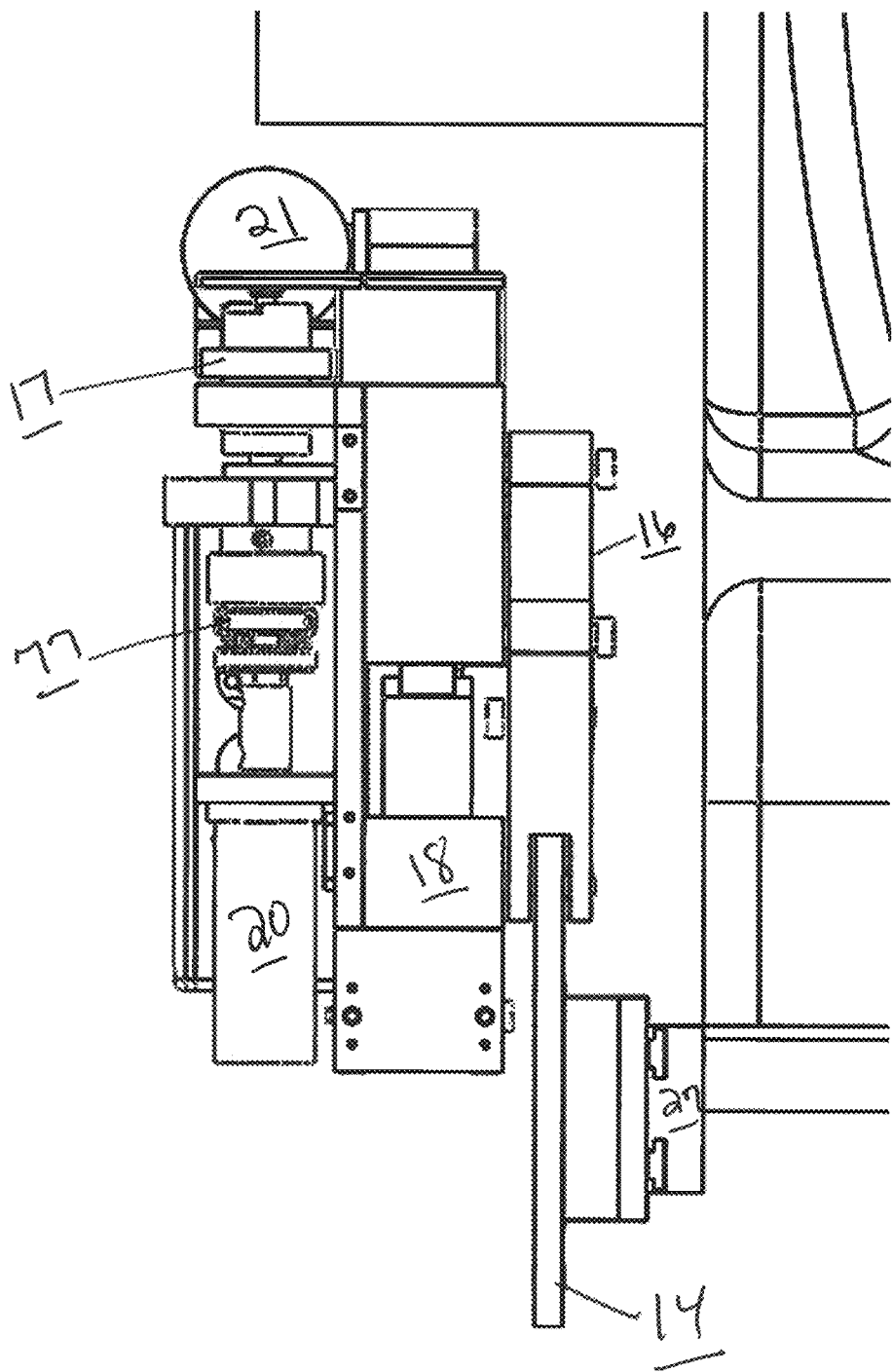
FIG. 9 illustrates a front view of the motorized mount of FIG. 6.
Figure 10:
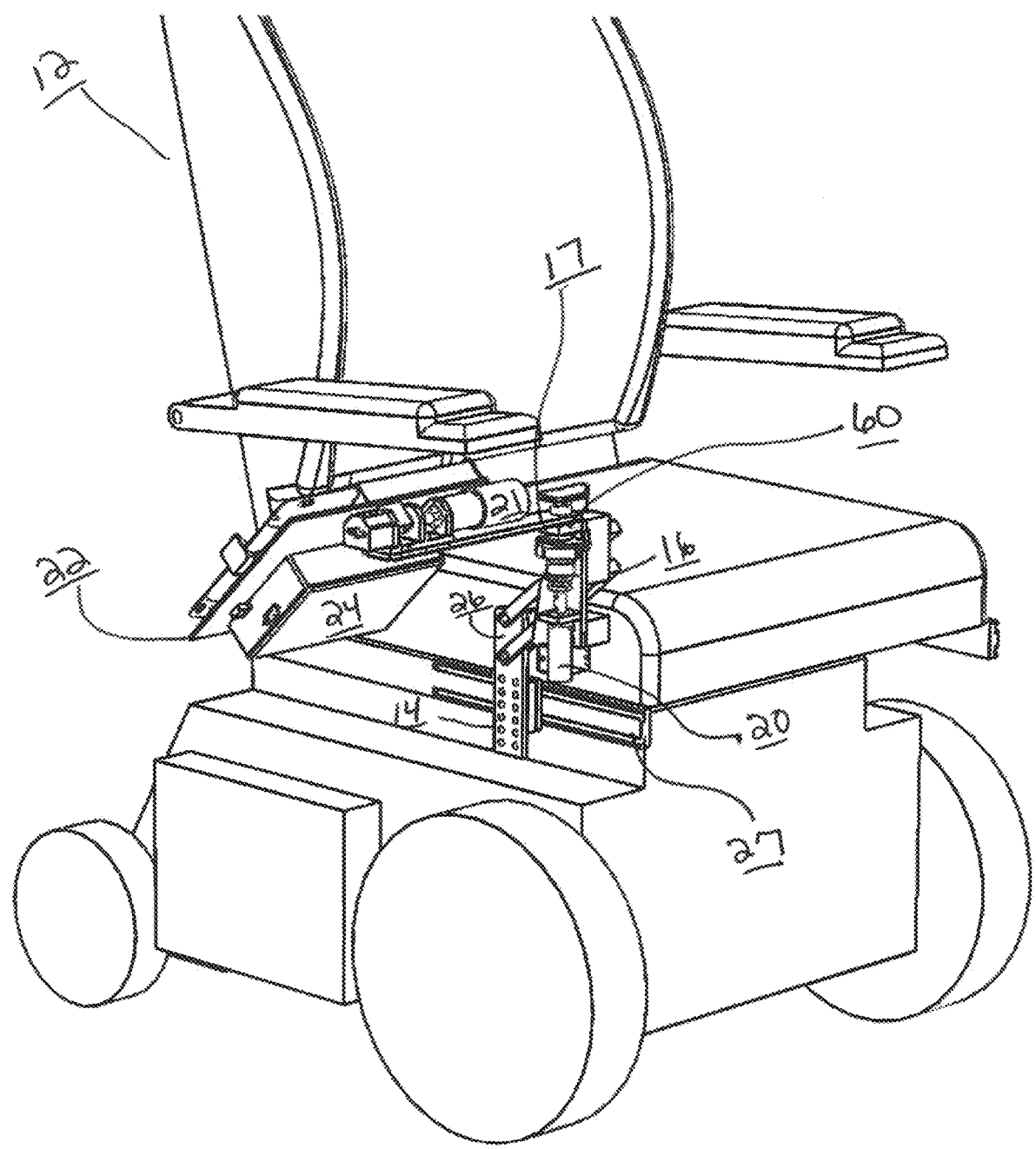
FIG. 10 illustrates an exemplary embodiment of the motorized mount of the present disclosure coupled to a wheelchair, wherein the motorized mount is in a second intermediate position.
Figure 11:
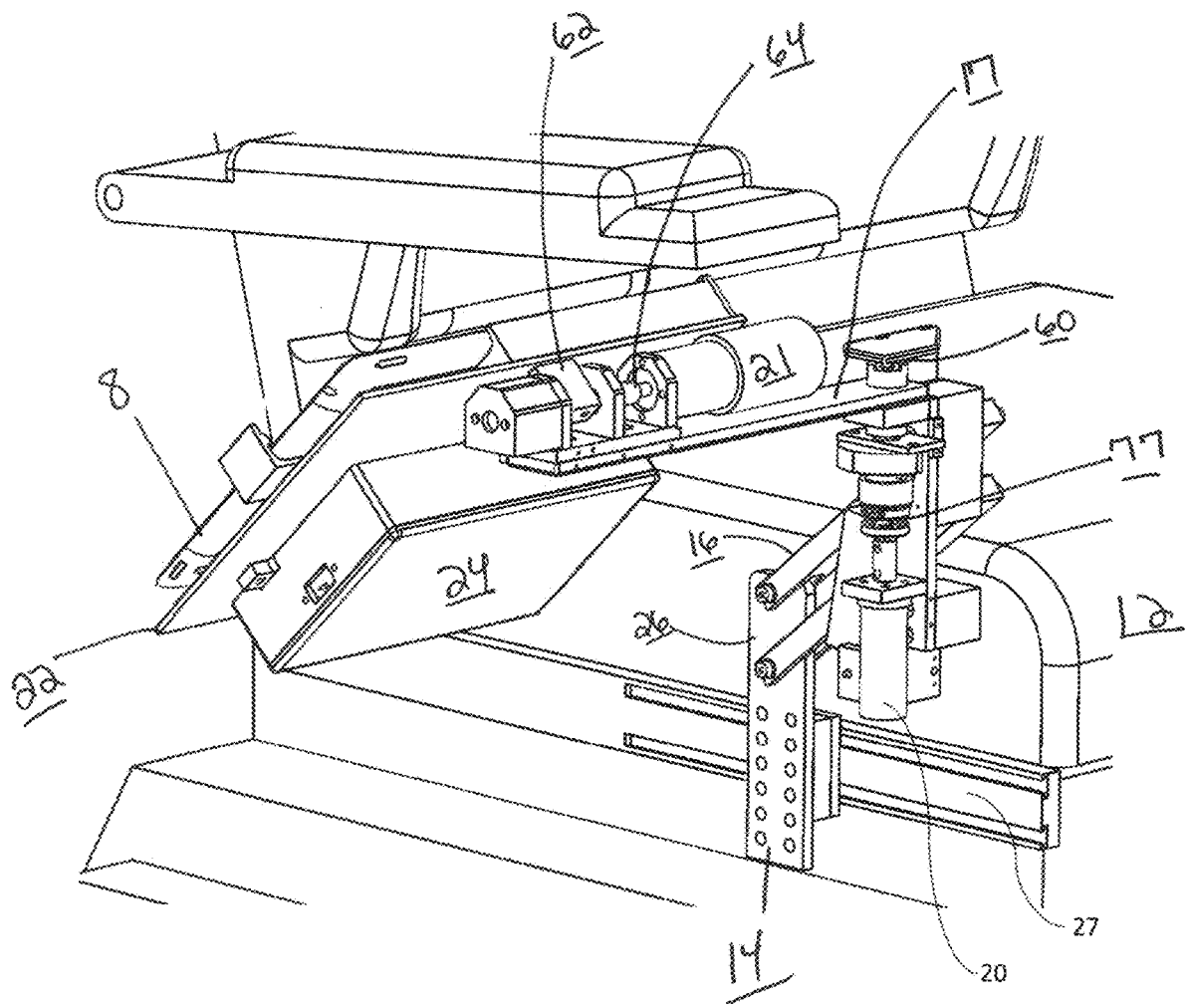
FIG. 11 illustrates a close-up perspective view of the motorized mount of FIG. 10.
Figure 12:
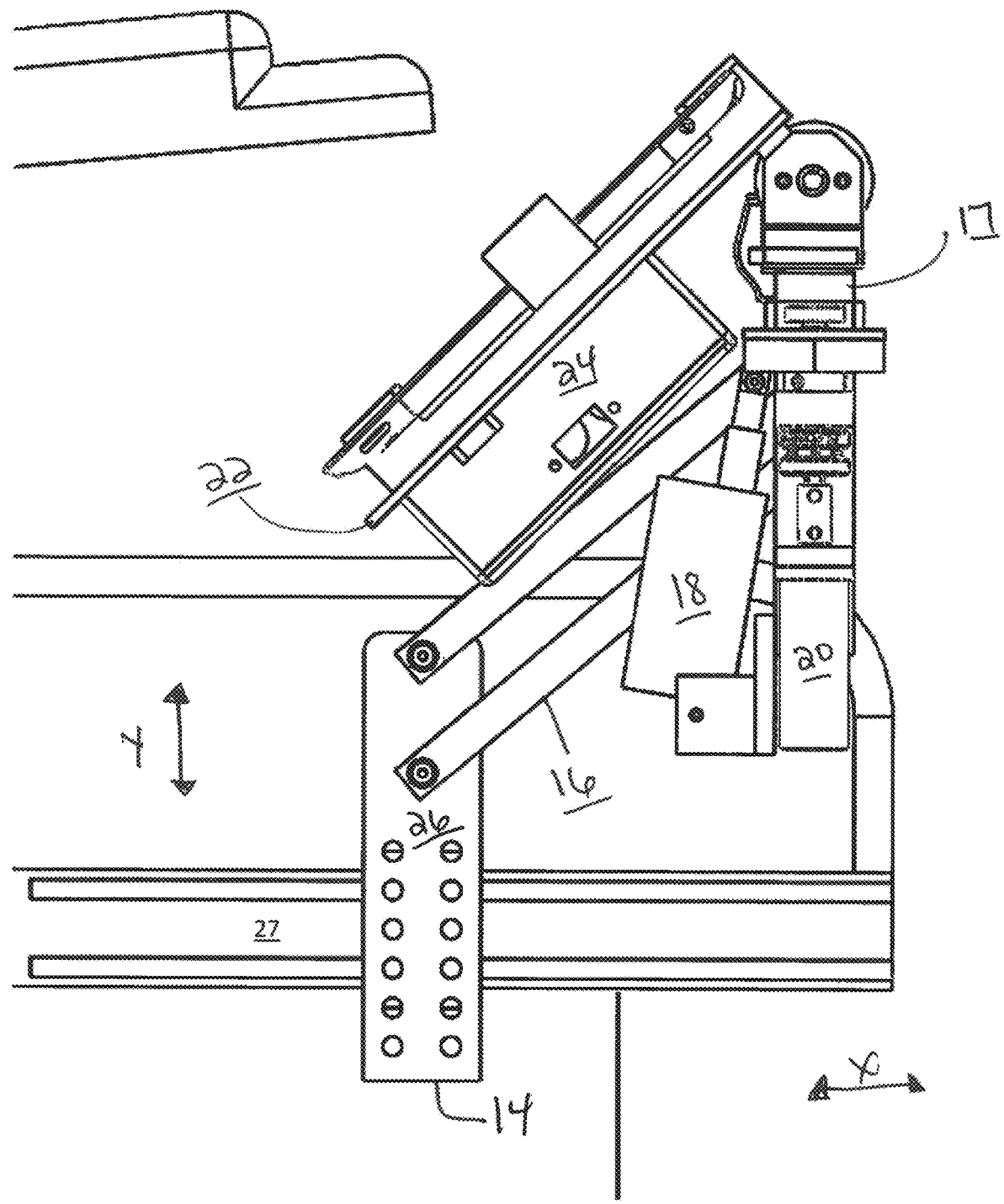
FIG. 12 illustrates a side view of the motorized mount of FIG. 10.
Figure 13:
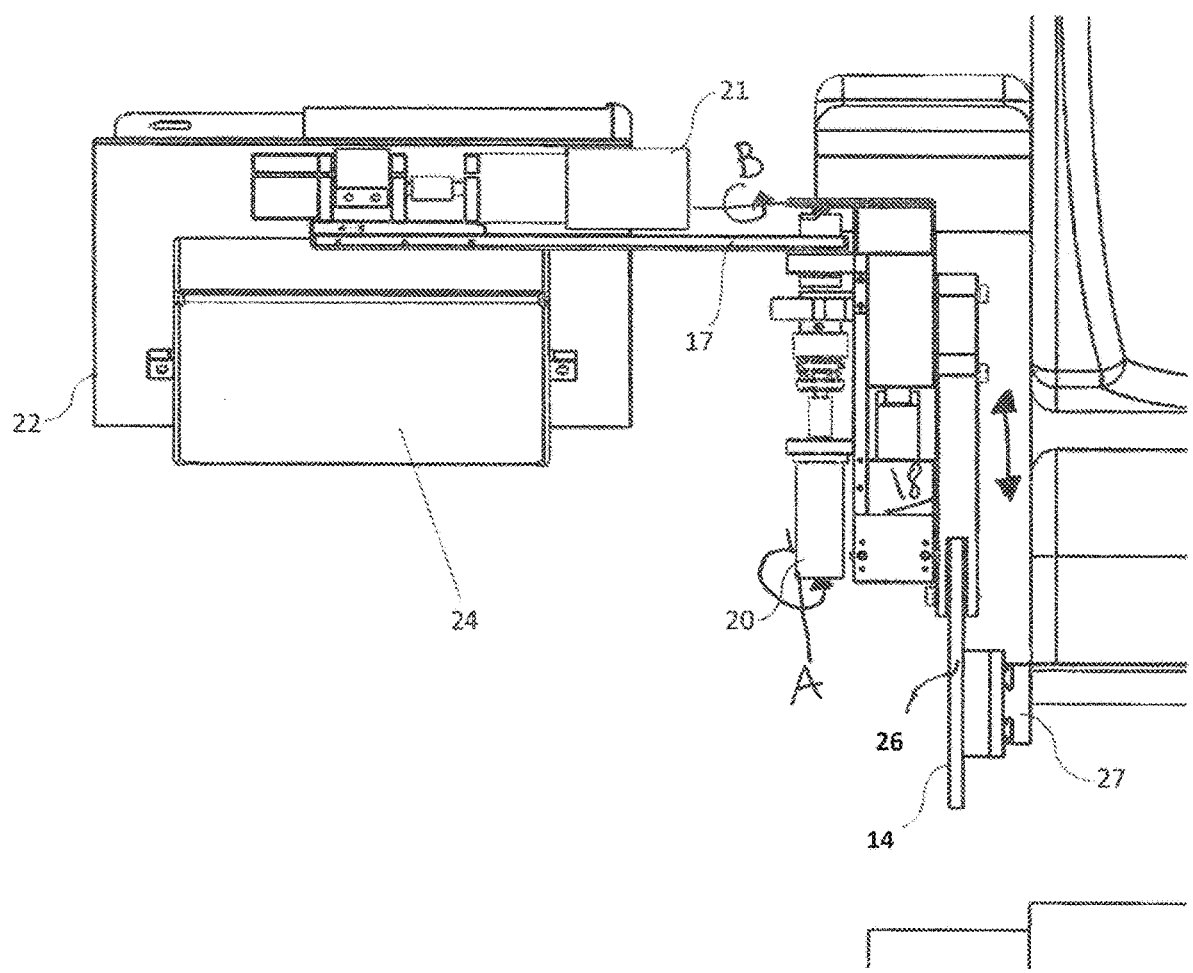
FIG. 13 illustrates a front view of the motorized mount of FIG. 10.
Figure 14:
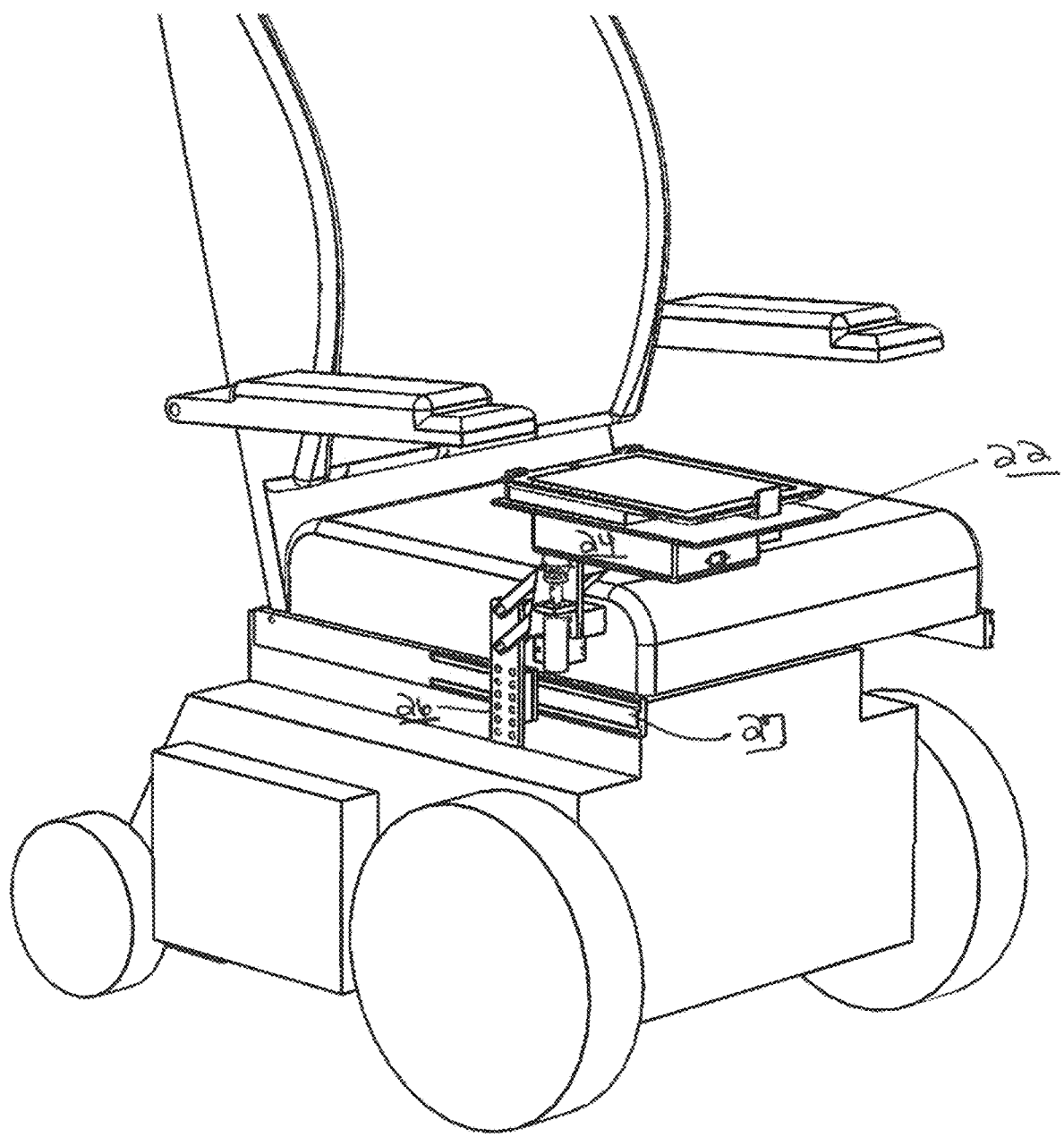
FIG. 14 illustrates an exemplary embodiment of the motorized mount of the present disclosure coupled to a wheelchair, wherein the motorized mount is in a third intermediate position.
Figure 15:
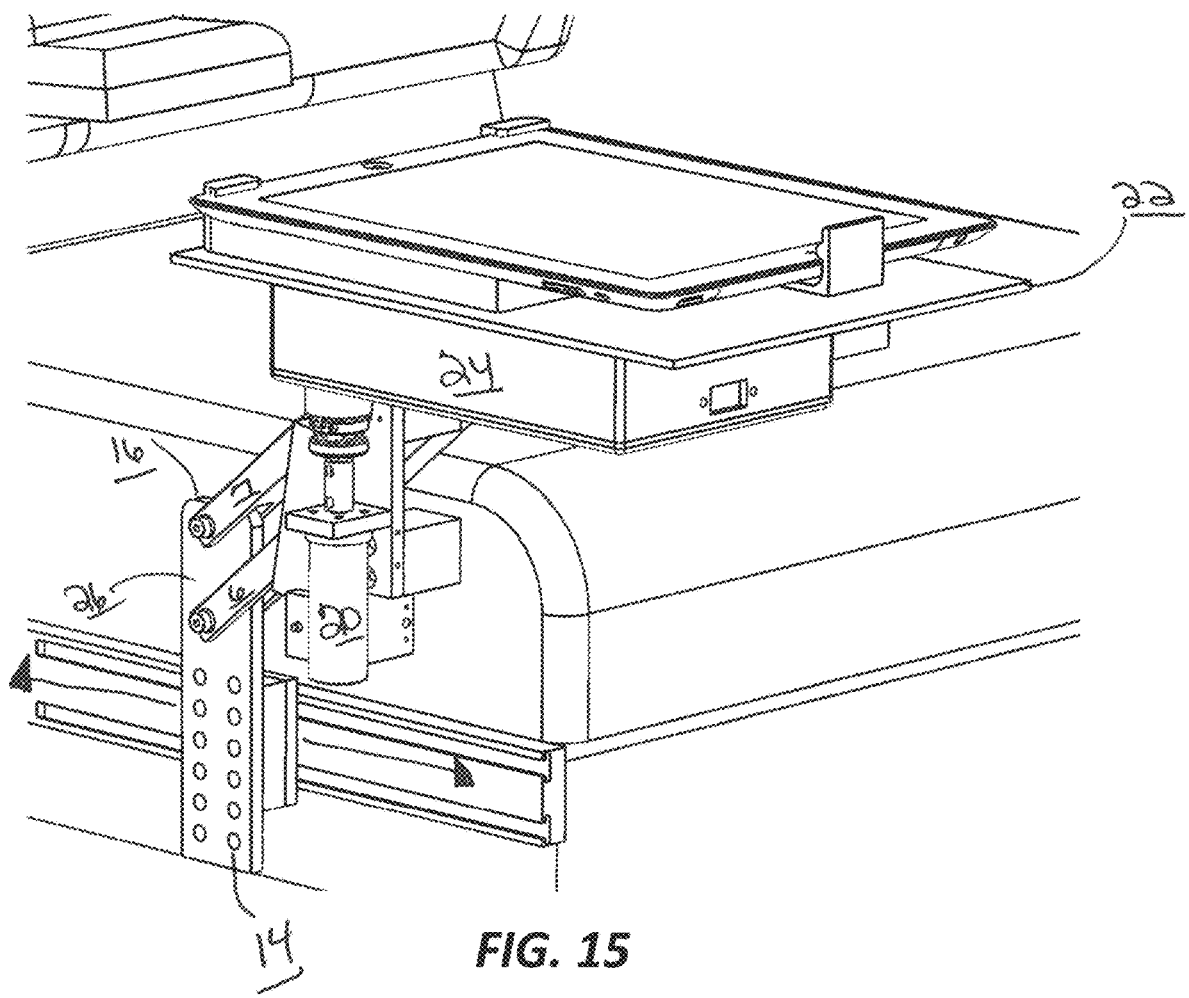
FIG. 15 illustrates a close-up perspective view of the motorized mount of FIG. 14.
Figure 16:
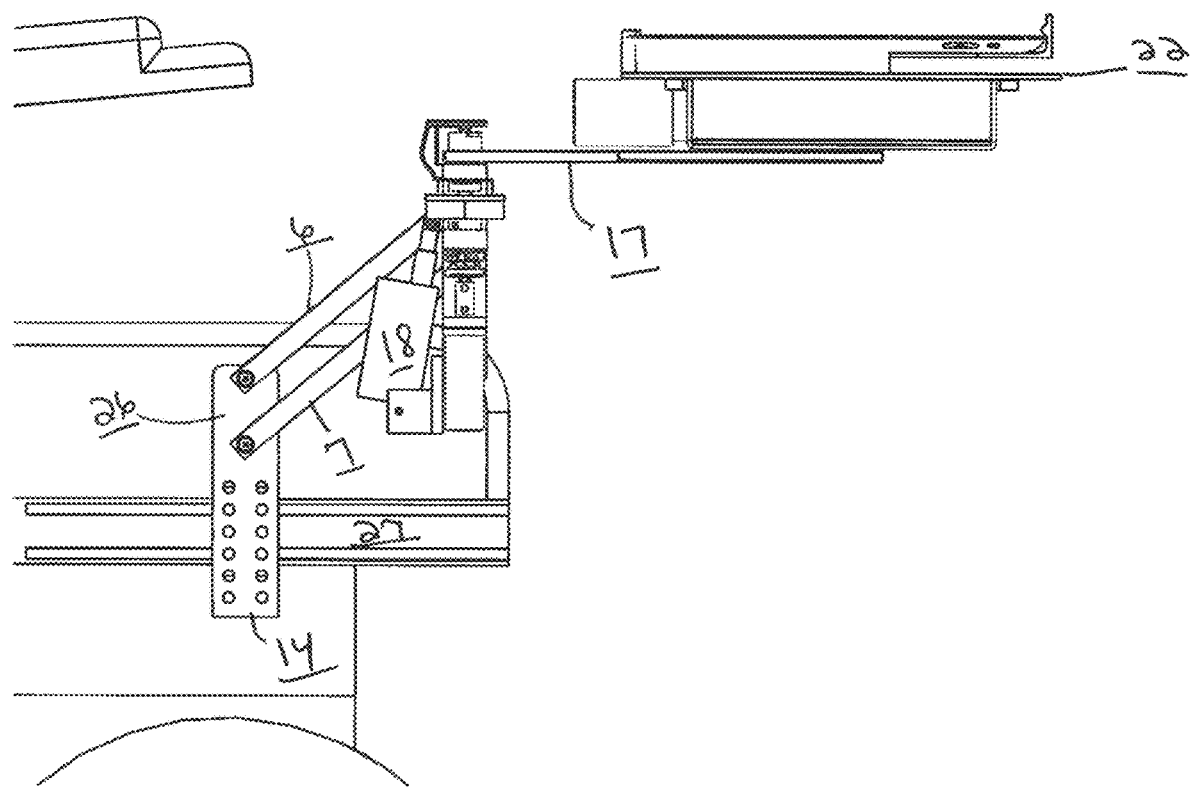
FIG. 16 illustrates a side view of the motorized mount of FIG. 14.
Figure 17:
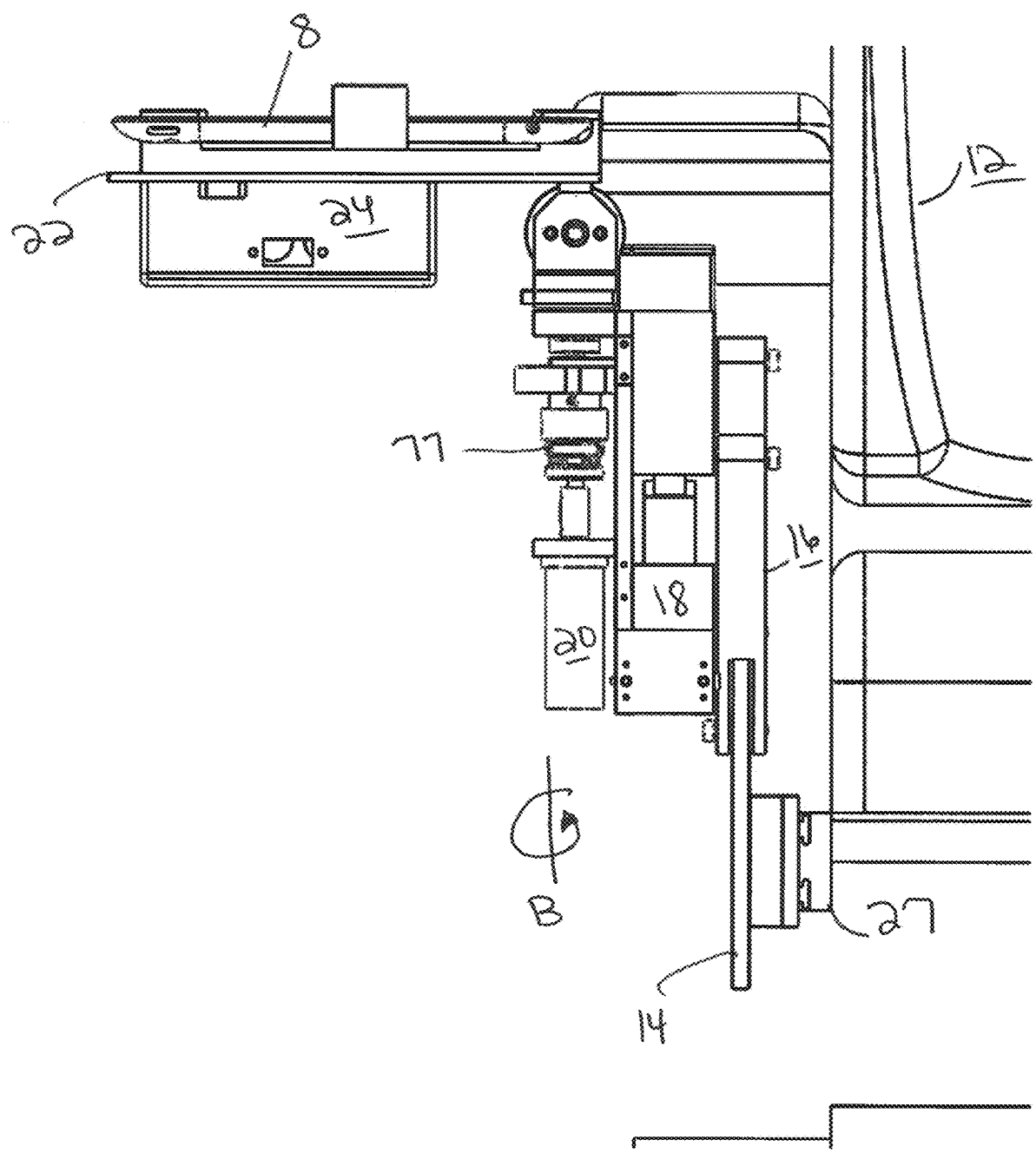
FIG. 17 illustrates a front view of the motorized mount of FIG. 14.
Figure 18:
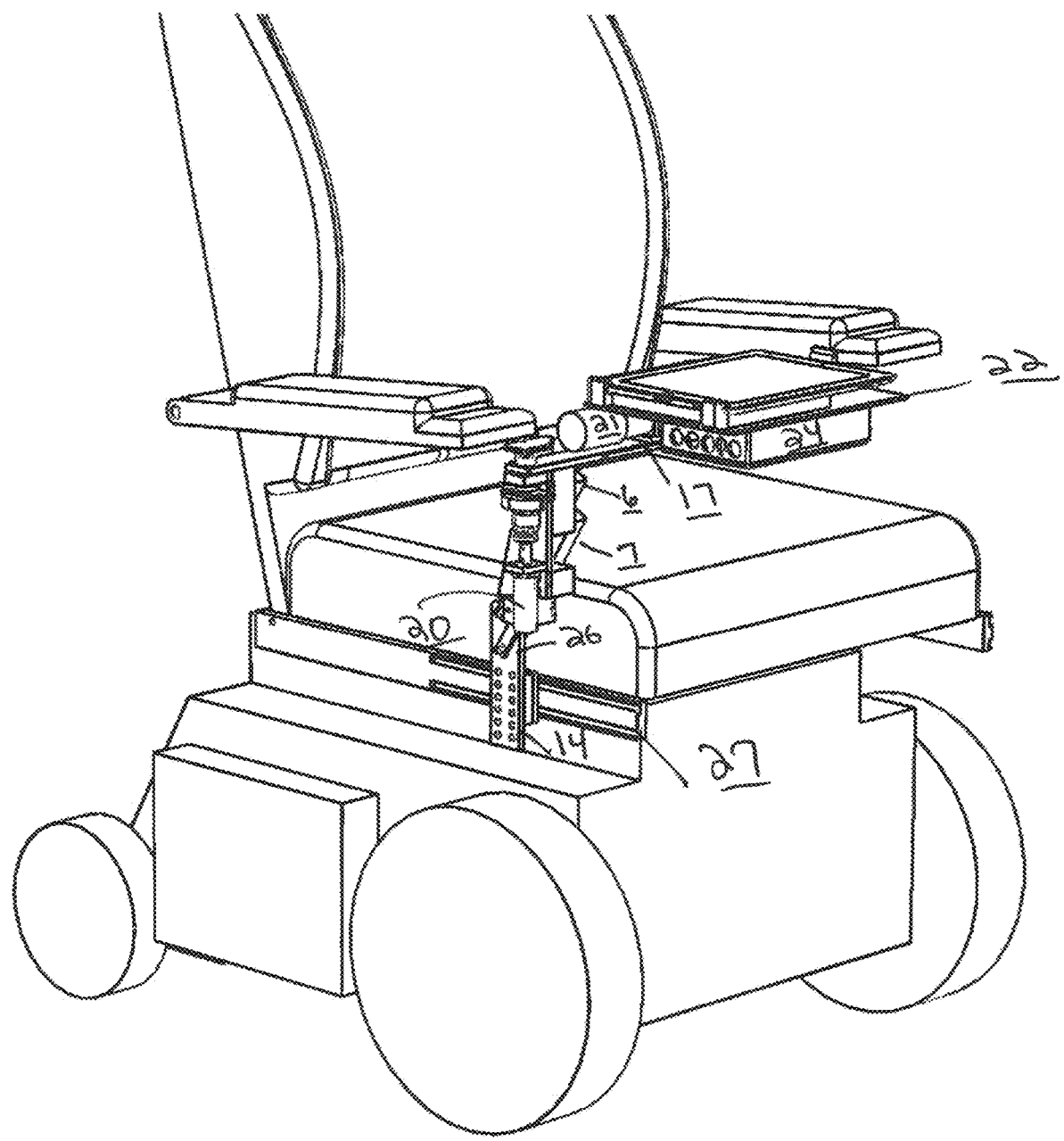
FIG. 18 illustrates an exemplary embodiment of the motorized mount of the present disclosure coupled to a wheelchair, wherein the motorized mount is in a fourth intermediate position.
Figure 19:
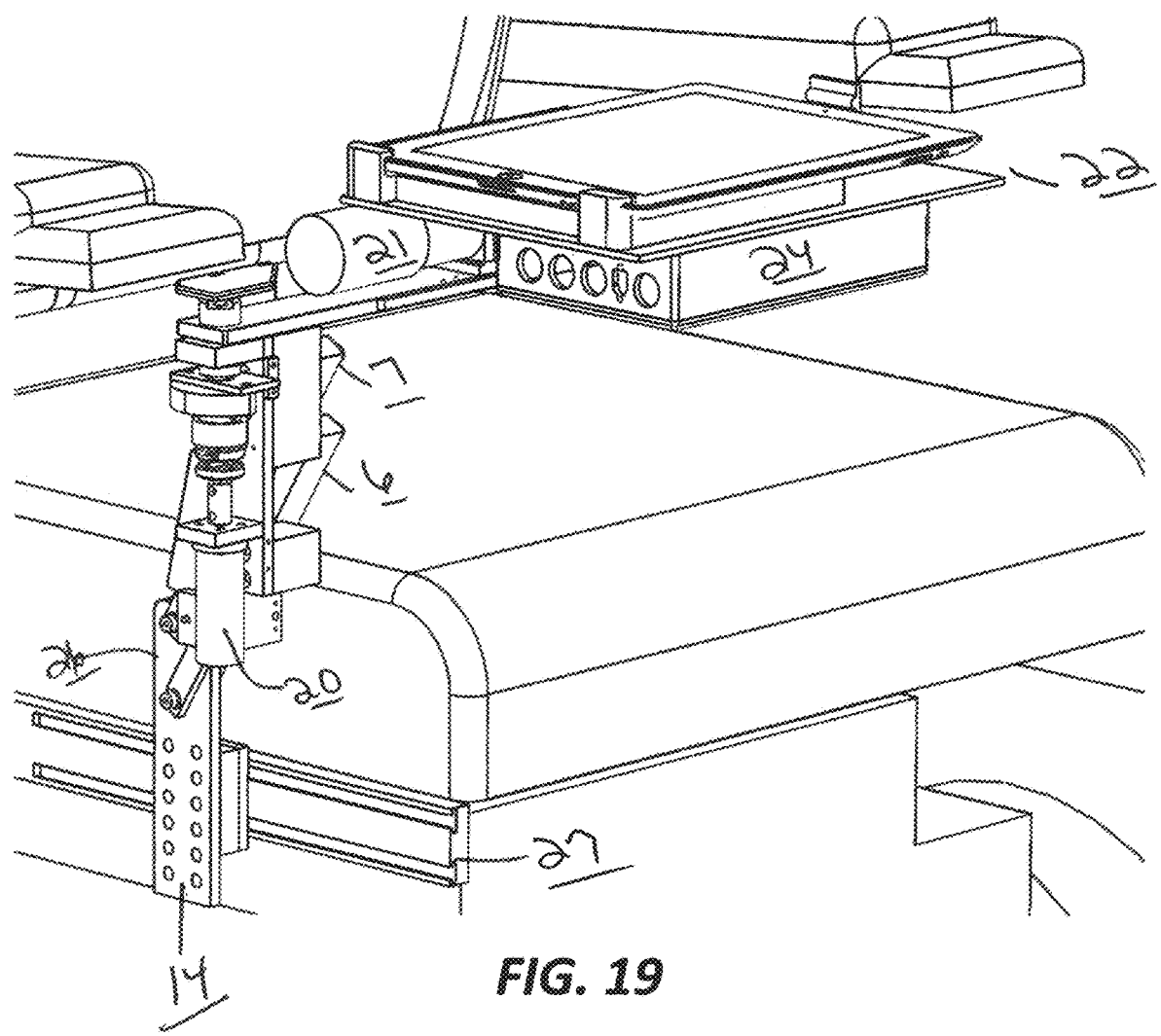
FIG. 19 illustrates a close-up perspective view of the motorized mount of FIG. 18.
Figure 20:
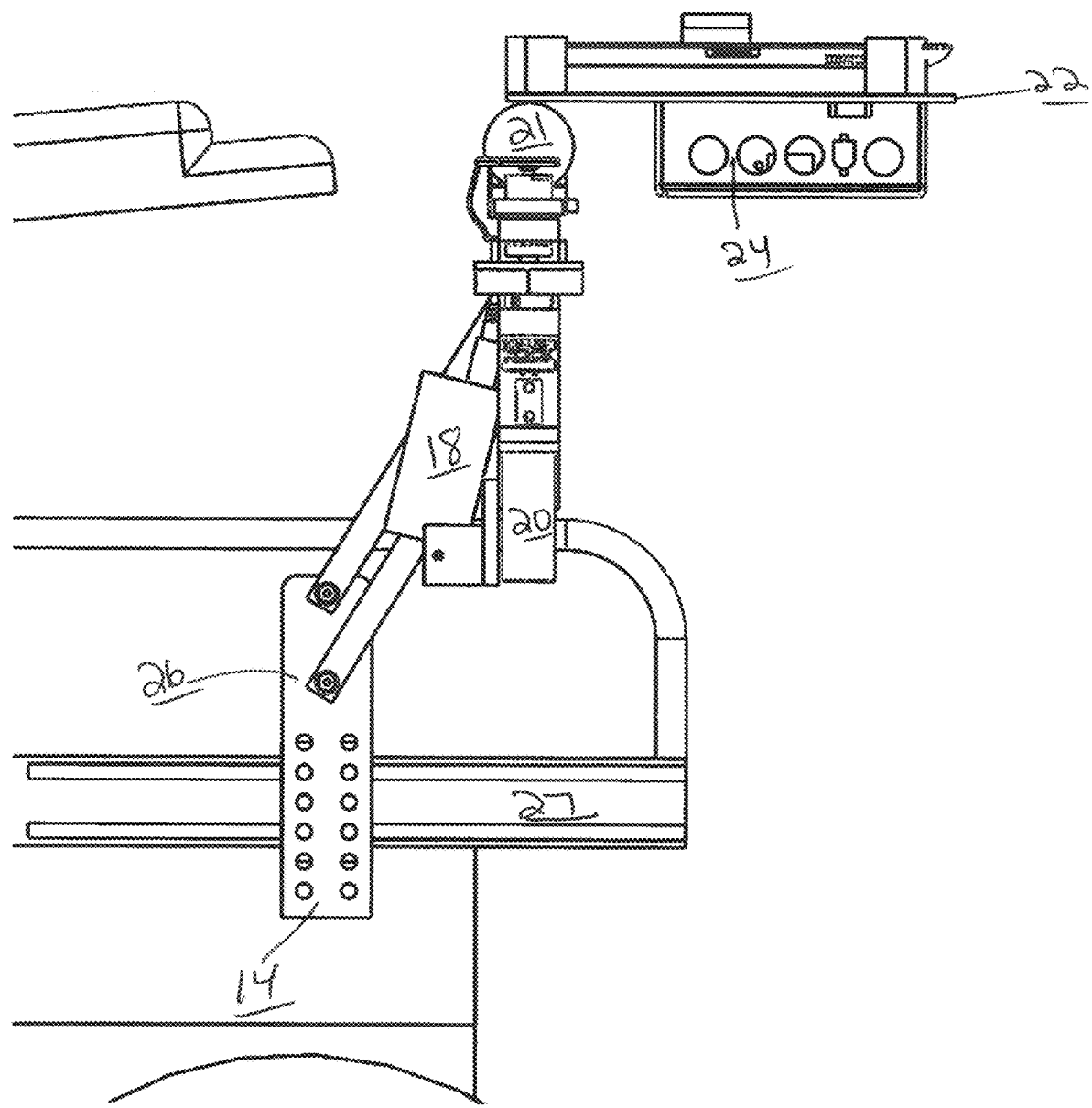
FIG. 20 illustrates a side view of the motorized mount of FIG. 18.
Figure 21:
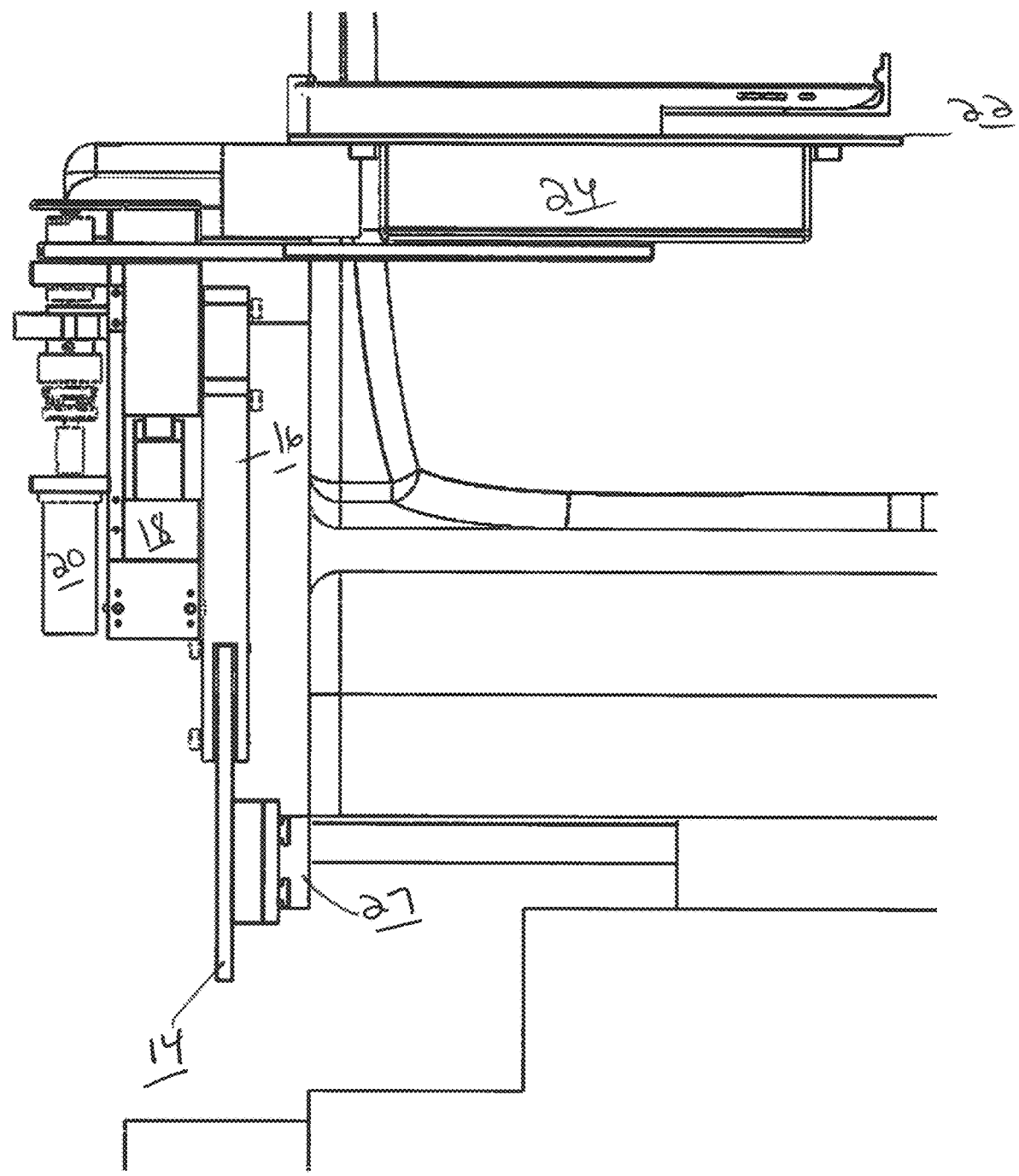
FIG. 21 illustrates a front view of the motorized mount of FIG. 18.
Figure 22:
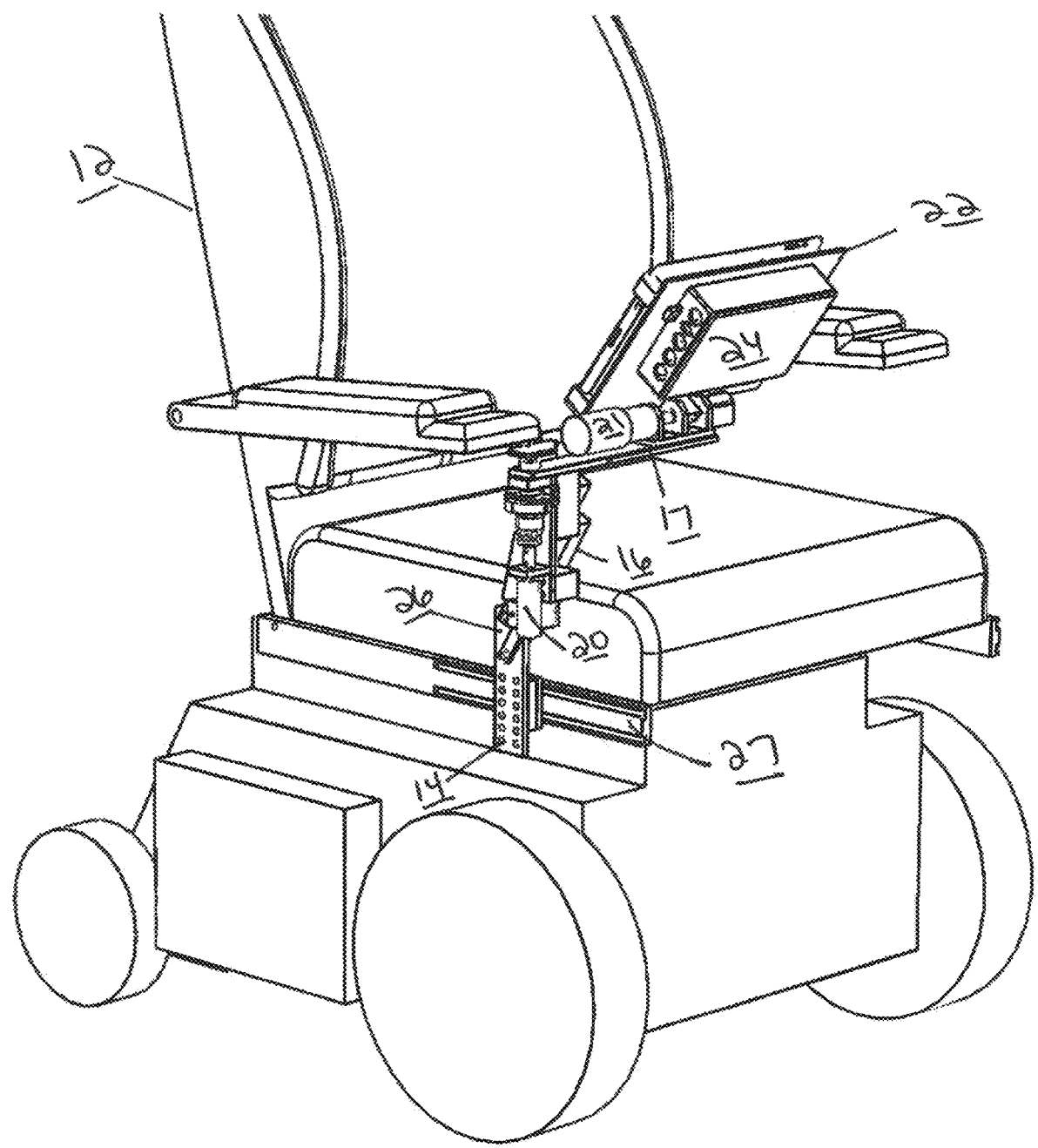
FIG. 22 illustrates an exemplary embodiment of the motorized mount of the present disclosure coupled to a wheelchair, wherein the motorized mount is in a fully deployed position.
Figure 23:
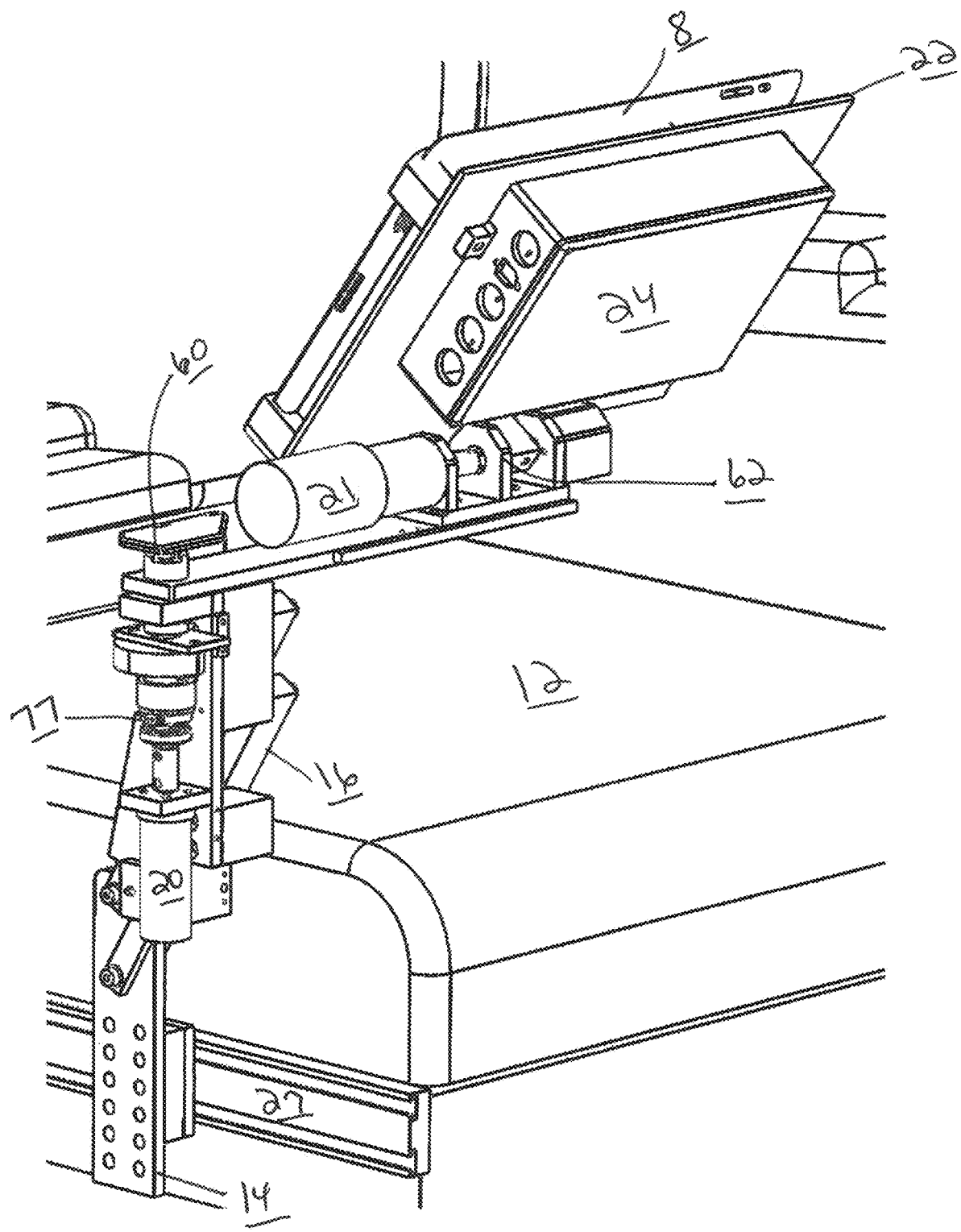
FIG. 23 illustrates a close-up perspective view of the motorized mount of FIG. 22.
Figure 24:
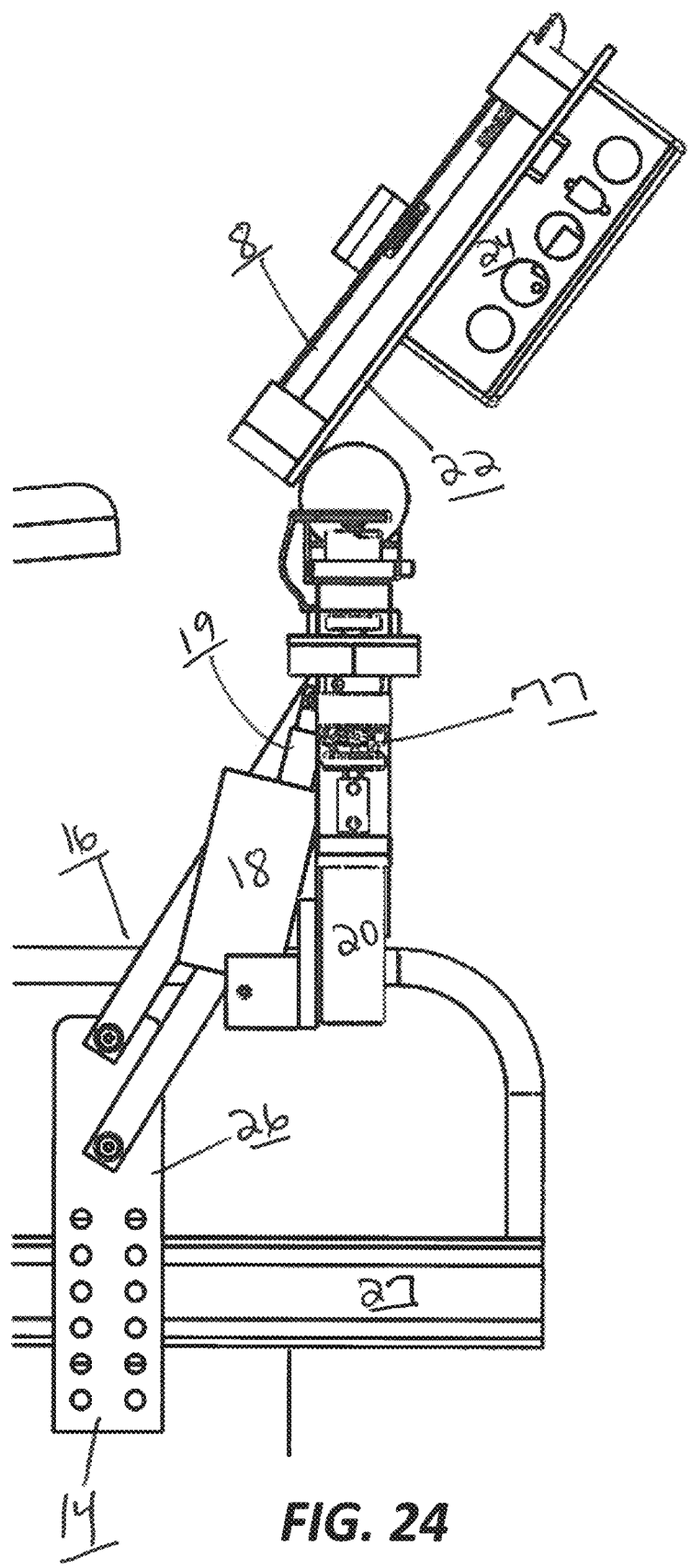
FIG. 24 illustrates a side view of the motorized mount of FIG. 22.
Figure 25:
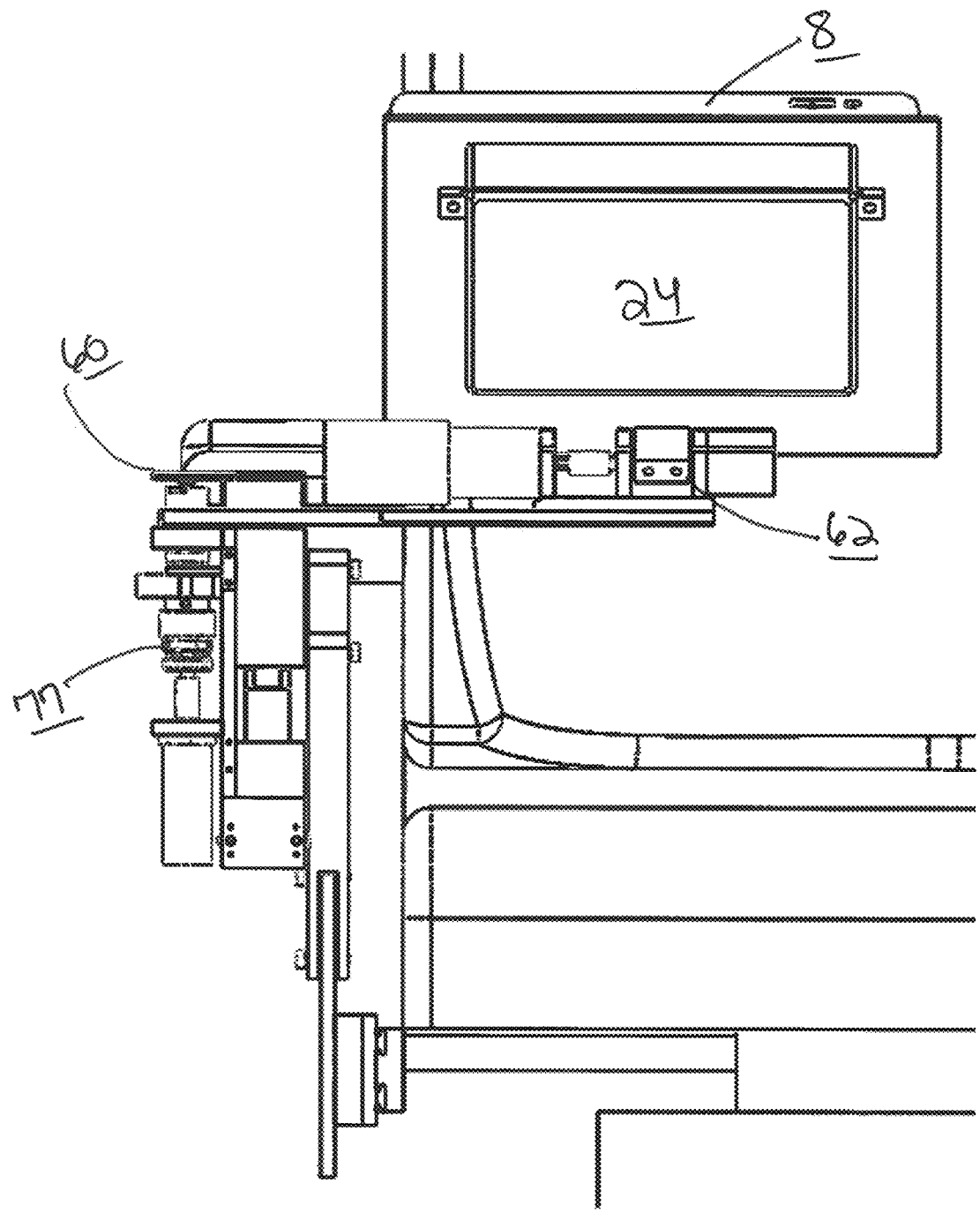
FIG. 25 illustrates a front view of the motorized mount of FIG. 22.

An exemplary embodiment of the motorized mount of the present disclosure can include a plurality of freedom, as illustrated in FIGS. 1-37. The movement of the motorized mount 10 may be partially or entirely controlled by the motors and linear actuator(s) by the control unit 24. The movements can be based on distinct degrees of freedom. The first degree of freedom shown between FIG. 1A and FIG. 1B is a vertical movement of the assembly 10 as powered by the linear actuator 18 of the parallel linkage assembly 16 or the linear actuator of the sliding assembly 30. A second degree of freedom is illustrated between FIG. 1B and FIG. 1C is the movement of the arm 17 up to 360 degrees of rotational movement using the first motor 20. The second degree of freedom can allow for the arm 17 to rotate around a central axis at the hinge 60. A third degree of freedom is the mounting assembly 22 moving around a central axis as illustrated between FIGS. 1E and 1F. This degree of freedom allows for the mounting assembly 22 that can include a personal computing device 8 to be tilted allowing for better viewing angles by a user. A fourth degree of freedom can include a horizontal movement of the attachment assembly 14 along the side rail 27 of the chair 12. This can be adjust to allow for the mounting assembly to move closer or further away from a user seated in the chair 12 when the motorized mount is fully deployed.

The linear actuator 18, 32 can be configured to move the mounting assembly in a first degree of freedom in a deploying manner, wherein the first degree of freedom comprises the vertical movement along a vertical axis. The first motor can be configured to move the arm in a second degree of freedom along a horizontal plane having about a 360 degree rotation movement around a vertical axis formed at the first hinge. The second motor can configured to move the mounting assembly in a third degree of freedom along a vertical plane having about a 360 degree rotation movement around a horizontal axis formed by the arm.

While certain illustrative embodiments have been described in detail in the drawings and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure.

The invention claimed is:

1. A motorized mount comprising;
   an attachment assembly configured to attach to a left or right side of a seating assembly;
   a parallel four-bar linkage connected to the attachment assembly;
   an arm having a first end attached to the four-bar linkage by a first hinge, the first hinge configured to allow the arm to rotate in a horizontal plane;
   a mounting assembly attached to a second end of the arm by a second hinge, the second hinge configured to allow the mounting assembly to rotate in a vertical plane to adjust the tilt of mounting assembly, the mounting assembly configured to receive a personal computing device;
   a linear actuator attached to the four-bar linkage to raise and lower the arm and mounting assembly;
   a first motor configured to attach to the arm and configured to move the arm in a horizontal plane; and
   a second motor configured to attach between the arm and the mounting assembly and configured to adjust a tilt position of the mounting assembly; and
   an electrical control unit operatively connected to the linear actuator, the first motor and the second motor, the control unit configured to control the operation of the linear actuator, the first motor, and the second motor.

2. The motorized mount of claim 1 further comprising; an input switch configured to control the linear actuator, the first motor and the second motor, and configured to move the four-bar linkage, the arm and personal computing device to a deployed position or a retracted position.

3. The motorized mount of claim 2, wherein the input switch is a single throw double pole switch, a single push button switch, two separate push button switches, a head array switch, a sip and puff switch, a brain-controlled interface, a voice recognition switch, a gesture recognition switch, or a touch screen interface.

4. The motorized mount of claim 3, wherein the mounting assembly is configured to attach to a wheelchair, furniture, or bed.

5. The motorized mount of claim 4, wherein the mounting assembly comprises a spring loaded quick release mounting bracket.

6. The motorized mount of claim 1, wherein the personal computing device is a tablet, smartphone, camera, laptop, or alternative or augmentative communication device.

7. The motorized mount of claim 1, wherein a battery power source integral to the seating assembly is connected to the electrical control unit to provide power to the electrical control unit.

8. A motorized mount comprising;
   an attachment assembly configured to attach to a left or right side of a seating assembly;
   a vertical control assembly connected to the attachment assembly;
   an arm having a first end attached to the vertical control assembly by a first hinge, the first hinge configured to allow the arm to rotate in a horizontal plane;
   a mounting assembly attached to a second end of the arm by a second hinge, the second hinge configured to allow the mounting assembly to rotate in a vertical plane to adjust the tilt of mounting assembly, the mounting assembly configured to receive a personal computing device;

a linear actuator attached to the vertical control assembly to raise and lower the arm and mounting assembly;

a first motor configured to attach to the arm and configured to move the arm in a horizontal plane; and a second motor configured to attach between the arm and the mounting assembly and configured to adjust a tilt position of the mounting assembly; and an electrical control unit operatively connected to the linear actuator, the first motor and the second motor, the control unit configured to control the operation of the linear actuator, the first motor, and the second motor.

9. The motorized mount of claim 8, wherein the vertical control assembly comprises a four-bar linkage assembly.

10. The motorized mount of claim 8, further comprising a microcontroller; a motor driver; a torque limiter; and at least one sensor systems.

11. The motorized mount of claim 10, wherein the linear actuator is configured to move the mounting assembly in a first degree of freedom in a deploying manner, wherein the first degree of freedom comprises the vertical movement along a vertical axis.

12. The motorized mount of claim 11, wherein the first motor is configured to move the arm in a second degree of freedom along a horizontal plane having about a 360 degree rotation movement around a vertical axis formed at the first hinge.

13. The motorized mount of claim 11, wherein the second motor is configured to move the mounting assembly in a third degree of freedom along a vertical plane having about a 360 degree rotation movement around a horizontal axis formed by the arm.

14. The motorized mount of claim 8, further comprising; an input switch configured to control the linear actuator, the first motor and the second motor, and configured to move the vertical control assembly, the arm and personal computing device to a deployed position or a retracted position.

15. The motorized mount of claim 14, wherein the switch is a single throw double pole switch, a single push button switch, two separate push button switches, a head array switch, a sip and puff switch, a brain-controlled interface, a voice recognition switch, a gesture recognition switch, or a touch screen interface.

16. The motorized mount of claim 15, wherein the mounting bracket is configured to attach to a wheelchair, furniture, or bed.

17. The motorized mount of claim 16, wherein the mounting bracket comprises a spring loaded quick release mounting bracket.

18. The motorized mount of claim 17, wherein the personal computing device is a tablet, smartphone, camera, laptop, or alternative or augmentative communication devices.

19. The motorized mount of claim 18, wherein a battery power source integral to the seating assembly is connected to the electrical control unit to provide power to the electrical control unit.

* * * * *